(12) United States Patent
Sherstyuk et al.

(10) Patent No.: US 11,050,281 B2
(45) Date of Patent: *Jun. 29, 2021

(54) SYSTEMS AND METHODS FOR ENHANCING THE PERFORMANCE AND UTILIZATION OF BATTERY SYSTEMS

(71) Applicant: GBatteries Energy Canada Inc., Ottawa (CA)

(72) Inventors: Mykola Sherstyuk, Ottawa (CA); Tymofiy Sherstyuk, Ottawa (CA); Mikhail Prokoptsov, Kanata (CA)

(73) Assignee: Gbatteries Energy, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,935

(22) Filed: Feb. 4, 2019

(65) Prior Publication Data

US 2020/0280203 A1    Sep. 3, 2020

Related U.S. Application Data

(63) Continuation of application No. 15/913,838, filed on Mar. 6, 2018, now Pat. No. 10,218,200, which is a
(Continued)

(51) Int. Cl.
*H02J 7/00* (2006.01)
*H01M 10/44* (2006.01)
(Continued)

(52) U.S. Cl.
CPC .......... *H02J 7/0068* (2013.01); *H01M 10/42* (2013.01); *H01M 10/425* (2013.01);
(Continued)

(58) Field of Classification Search
CPC ..................................... H02J 7/0068
(Continued)

(56) References Cited

U.S. PATENT DOCUMENTS 2,317,590 A    4/1943    Compere
3,987,353 A    10/1976   Macharg
(Continued)

FOREIGN PATENT DOCUMENTS

CN    201532995 U    7/2010
CN    201804941 U    4/2011
(Continued)

OTHER PUBLICATIONS

Extended European Search Report dated Nov. 20, 2015 received in Application No. 15151183.9.
(Continued)

*Primary Examiner* — Yalkew Fantu
(74) *Attorney, Agent, or Firm* — Schott, P.C.

(57) ABSTRACT

Methods and apparatuses are described for use in self-reconfigurable multi-cell batteries. The methods include during charging of a multi-cell battery that includes a plurality of battery cores and a plurality of switches, controlling the plurality of switches to connect the plurality of battery cores in a series configuration or in a parallel configuration based at least on one or more of a current capability of a battery charger and a voltage capability of the battery charger. The methods also include during discharging of the multi-cell battery, controlling the plurality of switches to connect the plurality of battery cores in the series configuration or in the parallel configuration based at least on one or more of a current requirement of a load and a voltage requirement of the load.

25 Claims, 15 Drawing Sheets

Related U.S. Application Data continuation of application No. 14/596,400, filed on Jan. 14, 2015, now Pat. No. 10,084,331, which is a continuation-in-part of application No. 14/386,889, filed as application No. PCT/CA2013/000277 on Mar. 25, 2013, now Pat. No. 9,966,780.

(60) Provisional application No. 62/061,881, filed on Oct. 9, 2014, provisional application No. 62/025,299, filed on Jul. 16, 2014, provisional application No. 61/977,096, filed on Apr. 9, 2014, provisional application No. 61/926,961, filed on Jan. 14, 2014, provisional application No. 61/683,691, filed on Aug. 15, 2012, provisional application No. 61/662,882, filed on Jun. 21, 2012, provisional application No. 61/615,282, filed on Mar. 25, 2012.

(51) Int. Cl.
*H01M 10/42* (2006.01)
*H01M 10/48* (2006.01)

(52) U.S. Cl.
CPC ....... *H01M 10/441* (2013.01); *H02J 7/00711* (2020.01); *H01M 10/4257* (2013.01); *H01M 10/4264* (2013.01); *H01M 10/482* (2013.01); *H02J 2007/0067* (2013.01)

(58) Field of Classification Search
USPC ....................................................... 320/129
See application file for complete search history.

(56) References Cited

U.S. PATENT DOCUMENTS

| | | |
|---|---|---|
| 4,016,473 A | 4/1977 | Newman |
| 4,680,241 A | 7/1987 | Dyer |
| 4,878,007 A | 10/1989 | Gabor et al. |
| 5,183,404 A | 2/1993 | Aldous et al. |
| 5,190,466 A | 3/1993 | McVey |
| 5,357,177 A | 10/1994 | Fey et al. |
| 5,411,405 A | 5/1995 | McDaniels et al. |
| 5,436,548 A | 7/1995 | Thomas |
| 5,500,583 A | 3/1996 | Buckley et al. |
| 5,504,415 A | 4/1996 | Podrazhansky et al. |
| 5,525,892 A | 6/1996 | Phommarath |
| 5,547,401 A | 8/1996 | Aldous et al. |
| 5,648,714 A | 7/1997 | Eryou et al. |
| 5,677,612 A | 10/1997 | Campagnuolo et al. |
| 5,701,068 A | 12/1997 | Baer et al. |
| 5,747,189 A | 5/1998 | Perkins |
| 5,828,201 A | 10/1998 | Hoffman, Jr. et al. |
| 5,931,704 A | 8/1999 | Johnson et al. |
| 5,955,869 A | 9/1999 | Rathmann |
| 5,989,042 A | 11/1999 | Johnson et al. |
| 6,002,240 A | 12/1999 | McMahan et al. |
| 6,033,240 A | 3/2000 | Goff |
| 6,078,166 A | 6/2000 | Taricco |
| 6,132,327 A | 10/2000 | Campagnolo |
| 6,146,210 A | 11/2000 | Cha et al. |
| 6,184,660 B1 | 2/2001 | Hatular |
| 6,232,750 B1 | 5/2001 | Podrazhansky et al. |
| 6,361,357 B1 | 3/2002 | Stillwell et al. |
| 6,364,697 B1 | 4/2002 | Tseng et al. |
| 6,366,056 B1 | 4/2002 | Podrazhansky et al. |
| 6,452,363 B1 | 9/2002 | Jabaji |
| 6,482,019 B1 | 11/2002 | Lo Forte et al. |
| 6,509,876 B1 | 1/2003 | Jones et al. |
| 6,561,824 B1 | 5/2003 | Beckham et al. |
| 6,707,272 B1 | 3/2004 | Thandiwe |
| 6,729,897 B2 | 5/2004 | Lai |
| 6,799,981 B1 | 10/2004 | Yu |
| 6,917,283 B2 | 7/2005 | Takeda |
| 7,189,089 B1 | 3/2007 | Liao |
| 7,364,473 B2 | 4/2008 | Ohta |
| 7,500,867 B1 | 3/2009 | Doglio et al. |
| 7,570,015 B2 | 8/2009 | Bansal et al. |
| 7,630,810 B2 | 12/2009 | Guderzo |
| 7,794,263 B1 | 9/2010 | Kim et al. |
| 7,918,686 B1 | 4/2011 | Lin |
| 8,137,116 B2 | 3/2012 | Omori et al. |
| 8,138,724 B2 | 3/2012 | Li et al. |
| 8,142,221 B2 | 3/2012 | Malstron et al. |
| 8,330,419 B2 | 12/2012 | Kim et al. |
| 8,330,420 B2 | 12/2012 | Kim et al. |
| 8,368,357 B2 | 2/2013 | Ghantous et al. |
| 8,427,106 B2 | 4/2013 | Kim et al. |
| 8,462,944 B2 | 6/2013 | Vanstone et al. |
| 8,513,921 B2 | 8/2013 | Berkowitz et al. |
| 8,698,022 B2 | 4/2014 | Kawakami |
| D718,241 S | 11/2014 | Gretz |
| 8,994,331 B2 | 3/2015 | Kerfoot, Jr. et al. |
| 9,054,440 B2 | 6/2015 | Taylor et al. |
| D734,271 S | 7/2015 | Tosto et al. |
| 9,966,780 B2 | 5/2018 | Sherstyuk et al. |
| D821,980 S | 7/2018 | Cousineau et al. |
| 10,020,608 B2 | 7/2018 | Cousineau et al. |
| 2002/0028604 A1 | 3/2002 | Lo et al. |
| 2003/0224637 A1 | 12/2003 | Ling |
| 2004/0005947 A1 | 1/2004 | Shahana et al. |
| 2004/0038087 A1 | 2/2004 | Shiue et al. |
| 2004/0146764 A1 | 7/2004 | Tsai et al. |
| 2004/0224539 A1 | 11/2004 | Boyd et al. |
| 2006/0091858 A1* | 5/2006 | Johnson ............ H01M 2/1022 320/128 |
| 2006/0092583 A1 | 5/2006 | Alahmad et al. |
| 2007/0141918 A1 | 6/2007 | Ohta |
| 2007/0273643 A1 | 11/2007 | Erez et al. |
| 2008/0079397 A1 | 4/2008 | Fee et al. |
| 2010/0164430 A1 | 7/2010 | Lu et al. |
| 2011/0076525 A1* | 3/2011 | Zhang ................. H01M 10/42 429/10 |
| 2011/0198103 A1 | 8/2011 | Suzuki |
| 2012/0025756 A1 | 2/2012 | Xu et al. |
| 2012/0256568 A1 | 10/2012 | Lee |
| 2013/0234667 A1 | 9/2013 | Norton |
| 2015/0048796 A1* | 2/2015 | Sherstyuk ........... H01M 10/425 320/129 |
| 2016/0104966 A1 | 4/2016 | Cousineau et al. |
| 2017/0005497 A1 | 1/2017 | Sherstyuk et al. |
| 2018/0226826 A1 | 8/2018 | Sherstyuk et al. |

FOREIGN PATENT DOCUMENTS

| | | |
|---|---|---|
| JP | H16163081 A | 6/1994 |
| SU | 922923 A1 | 4/1982 |
| WO | 2011/132300 A1 | 10/2011 |
| WO | 2013/142964 A1 | 10/2013 |

OTHER PUBLICATIONS

International Search Report and Written Opinion of the International Searching Authority for PCT Application No. PCT/CA2013/00277 dated Jun. 13, 2013.

Alzieu, J., et al., "Improvement of intelligent battery controller: state-of-charge indicator and associated functions," Journal of Power Source, vol. 67, No. 1-2, pp. 157-161 (1997).

Chiasserini, C. F., and Rao, R.R., "Pulsed battery discharge in communication devices," Proceedings of Mobicom'99, Seattle, pp. 88-95, Aug. 1999.

Chiasserini, C.F., and Rao, R.R., "A Model for Battery Pulsed Discharge with Recovery Effect," Wireless Communications and Networking Conference WCNC. 1999 IEEE, vol. 2, pp. 636-639 (1999).

Fuller, T.F., et al., "Relaxation phenomena in lithium-Ion-insertion cells," Journal of the Electrochemical Society, vol. 141, No. 4, pp. 982-990 (1994).

Gomadam, P.M. et al., "Analysis of Pulse Discharge of a Lithium-Ion Battery," Center for Electrochemical Engineering, University of South Carolina, accessed at https://www.electrochem.org/dl/ma/200/pdfs/0148.pdf, p. 1 (Aug. 2014).

(56) References Cited

OTHER PUBLICATIONS

Lafollette, R. M. et al., "Design fundamentals of high power density, pulsed discharge, lead-acid batteries. II Modeling," Journal of The Electrochemical Society, vol. 137, No. 12, pp. 3701-3707 (1990).

Lafollette, R. M., "Design and performance of high specific power, pulsed discharge, bipolar lead acid batteries," Proceedings of the Tenth Annual Battery Conference on Applications and Advances, pp. 43-47 (1995).

Li, J., et al., "The effects of pulse charging on cycling characteristics of commercial lithium-ion batteries," Journal of Power Sources, vol. 102, School of Chemical Engineering, Georgia Institute of Technology, pp. 302-309 (2001).

Nelson, R.F., et al., "Ultrafast pulse discharge and recharge capabilities of thin-metal film battery technology," 12th Annual Battery Conference on Applications and Advances, Long Beach, pp. 636-641 (Jan. 1997).

Nelson, B., "TMF ultra-high rate discharge performance," 12th Annual Battery Conference on Applications and Advances, Long Beach, pp. 139-143 (Jan. 1997).

Rihito, M., and Hara, S., "A Pulsed Discharge Control of Battery," TENCON 2006. 2006 IEEE Region 10 Conference, Graduate School of Engineering, Osaka University, pp. 1-4 (2006).

"How DEWALT® FLEXVOLT® 20V/60V* MAX Batteries Work," DEWALT TV, Published on Jun 21, 2016, accessed at https://www.youtube.com/watch?v=NIJZL3Zrlwo, accessed on Feb. 26, 2019, pp. 3.

* cited by examiner

SYSTEMS AND METHODS FOR ENHANCING THE PERFORMANCE AND UTILIZATION OF BATTERY SYSTEMS

RELATED APPLICATIONS

This application is a Continuation application under 35 U.S.C. § 120 of U.S. patent application Ser. No. 15/913,838, filed on Mar. 6, 2018 and entitled "SYSTEMS AND METHODS FOR ENHANCING THE PERFORMANCE AND UTILIZATION OF BATTERY SYSTEMS," which is a Continuation application under 35 U.S.C. § 120 of U.S. patent application Ser. No. 14/596,400, now U.S. Pat. No. 10,084,331, filed on Jan. 14, 2015 and entitled "SYSTEMS AND METHODS FOR ENHANCING THE PERFORMANCE AND UTILIZATION OF BATTERY SYSTEMS," which is a Continuation-in-part application under 35 U.S.C. § 120 of U.S. patent application Ser. No. 14/386,889, now U.S. Pat. No. 9,966,780, filed on Sep. 22, 2014 and entitled "EXTENDED LIFE BATTERY," which is a U.S. National Stage filing under 35 U.S.C. § 371 of International Application No. PCT/CA2013/000277, filed on Mar. 25, 2013 and entitled "EXTENDED LIFE BATTERY," claiming priority to U.S. Provisional Patent Application No. 61/615,282, filed on Mar. 25, 2012 and entitled "CONTROLLED MULTI-CORE BATTERY SYSTEM," to U.S. Provisional Patent Application No. 61/662,882, filed on Jun. 21, 2012 and entitled "MULTICORE RECHARGEABLE BATTERY WITH EXTENDED CALENDAR LIFE," and to U.S. Provisional Patent Application No. 61/683,691, filed on Aug. 15, 2012 and entitled "MULTI-CORE RECHARGEABLE BATTERY WITH EXTENDED CALENDAR LIFE," all of which are incorporated herein by reference in their entirety. The U.S. patent application Ser. No. 14/596,400 also claims priority to U.S. Provisional Patent Application No. 61/926,961, filed on Jan. 14, 2014 and entitled "METHOD OF BATTERY CONTROL UTILIZING A PULSE PROTOCOL," to U.S. Provisional Patent Application No. 61/977,096, filed on Apr. 9, 2014 and entitled "METHOD OF BATTERY CONTROL FOR NEW ANODE AND ENERGY STORAGE SYSTEM," to U.S. Provisional Patent Application No. 62/025,299, filed on Jul. 16, 2014 and entitled "METHOD, DEVICE AND SYSTEMS FOR CHARGING OF PORTABLE ELECTRONIC DEVICES," and to U.S. Provisional Patent Application No. 62/061,881, filed on Oct. 9, 2014 and entitled "BATTERY SYSTEMS UTILIZING HELPER CELLS," the contents of all of which are incorporated herein by reference in their entirety.

FIELD OF INVENTION

The present invention relates to battery technology and methods of extending and recovering battery lifetime and charge storage capacity.

BACKGROUND INFORMATION

The advances in battery technology cannot keep up with market demands. Effective solutions to extend or preserve battery lifetime and storage capacity needed.

Batteries are electrochemical energy storage systems. The lifetime of a battery is limited by the aging process. A battery ages (loses its energy storage capacity) with use, and with time, even if not used. After the energy storage capacity of a battery has decreased below a threshold value it is said to have reached its end of life. Aging from use is called "life cycle aging", while aging with time, is known as "calendar aging." These two processes occur together, and their magnitudes depend on the battery's application and usage pattern. As such, one process may dominant.

A battery's operating conditions affect the aging process. Temperature and high charging voltages are some of the most relevant factors in aging. Exposing a battery to high temperatures and storing the battery in a full state-of-charge for an extended period may age a battery faster than charge-discharge cycling from use. Different battery types have different life cycle aging and calendar aging characteristics.

Lithium ion batteries are widely used in laptops, cell phones and other portable applications. Lithium-ion batteries age significantly when exposed to elevated temperatures and when stored in a fully charged (high voltage) state. A temperature above 30° C. (86° F.) is considered an elevated temperature for Lithium ion batteries. For most Lithium-ion (Li-ion) batteries, a cell voltage above 4.10 V is considered a high voltage.

A lithium ion laptop battery is usually exposed to an elevated temperature when operating. In normal use, a laptop battery is also usually fully charged and may rarely be disconnected from the charger. Some cell phone batteries experience similar operating conditions. It is common for a cell phone battery to lose much of its capacity during the first one or two years of its calendar life A short description of how batteries operate is provided for convenience. Batteries contain chemically active materials and deliver energy through electrochemical reactions. When current is discharged from the battery, two concurrent phenomena occur:

i) the concentration of the active materials around the electrode drops forming a depletion region and generating a concentration gradient. This is known as the polarization effect. This concentration gradient acts as an internal resistance and reduces the charging efficiency of the battery;

ii) at the same time, the active materials move toward the depletion region due to a diffusion process resulting in a decreased gradient concentration and decreasing the polarization effect.

Depletion typically occurs faster than diffusion. Both phenomena act concurrently to distribute the active materials. In the ideal case depletion takes place at a similar rate to the diffusion and the concentration of active material is at an ideal equilibrium point whereby the battery has maximum efficiency. In reality however, the equilibrium point usually settles at a different level. If diffusion constantly exceeds depletion, the battery delivers less energy than expected. Conversely, if the polarization effect overcomes the diffusion process, the battery will be discharged before the active materials are actually exhausted.

US patent application No. 2010/0164430 (Lu) shows that during discharging of a Lithium-ion battery cell (or cells), lithium ions accumulate on the cathode. Conversely, during charging, the lithium ions accumulate on the anode of the battery. The accumulation of ions during discharging generates a concentration gradient which compensates for the movement of ions during discharging. A gradient is also produced during the battery charging process. In an equivalent circuit model, the concentration gradients are modelled as internal resistances that decrease battery efficiency during charging and discharging. If a battery has a large internal resistance then a large portion of its stored energy is dissipated internally by the internal resistance when it is discharging and is not delivered to the load. Similarly the internal resistance will dissipate energy during charging making charging less efficient. A battery's storage capacity is therefore diminished by internal resistance.

It is known that battery capacity and lifetime can be improved by using a pulsed discharge current instead of a constant discharge current. A charge recovery process occurs in the battery during the time between discharge pulses (the "rest time") when the discharge current is not flowing.

It is also known that the battery lifetime and capacity can be significantly increases when by pulse charging a battery. Some studies also suggest that reversing the current for a short time during charging or discharging in a technique known as the 'mode reversal', positively affects battery capacity and lifetime. For example when a short discharge pulse is applied prior to each charging pulse, this improves the charging process of the battery. When a short charging pulse is applied prior to each discharging pulse, this improves the battery recovery between discharging pulses and increases the battery storage capacity.

A battery's state of charge is directly related to the discharge current rate and decreased by it. If the discharge current is interrupted, however the battery's state of charge may recover and improve during the interruption. The recovery process is dependent on the duration of the interruption, the capacity of the battery, and the present state of charge of the battery. The recovery effect progressively decreases as the battery's state of charge decreases, until all the active materials are exhausted and the battery is depleted.

In one simple known battery model that describes battery behavior during the discharge process the recovery mechanism depends only on the rest time. Other battery models take into account the degradation of the recovery mechanism as the battery state-of-charge decreases.

Typically Lithium-ion batteries used in mobile applications last between one and four years during which interval they constantly lose the capacity to hold a charge for long periods of time. These battery systems are typically used in cell phones, cameras, tablets, battery packs, portable power tools and laptops due to their high energy density. The capacity loss is mainly due to increased internal resistance. Processes causing an increased internal resistance are more damaging when the battery charge state is close to full for longer periods. The internal cell resistance increases to a point where the battery pack can no longer deliver the stored energy irrespective of the fact that the battery indicates it is fully charged. In other words, a new battery, when fully charged delivers its nominal charge. An aged battery delivers less than its nominal charge.

Internal resistance typically increases for lithium-ion and lithium-polymer batteries with time and with each charge/discharge cycle. The aging speed is dependent on the working temperature and the battery state-of-charge. In most mobile devices the battery to is in a fully-charged state while the device is plugged into a power adapter. The constant fully-charged state of the battery and elevated working temperatures contribute to a reduction of the battery life.

SUMMARY OF THE INVENTION

There is a need for an improved battery charging process for rechargeable batteries in order to increase battery lifetime while also increasing the battery charging speed.

There is also a need to extending and preserving the lifetime of batteries for obtaining important savings to the battery users.

Furthermore, there is a need to reduce the impact of the discharged battery on the environment; by extending battery lifetime, the impact on the environment can be significantly reduced, along the expense for disposing the depleted batteries.

A method comprising performing a charge and a discharge operation of a cell within a electrochemical energy storage system whereby said charge and discharge operations are performed internally to the electrochemical energy storage system is disclosed.

In an embodiment the charge and discharge operations are performed between at least a first storage cell and at least a second storage cell.

In another embodiment the charge and discharge operations are performed between at least a first storage cell and at least a passive storage element.

The passive energy storage element could be a capacitor or an inductor.

In another embodiment the charge operation is performed between at least a first cell and a combination of a plurality of other cells and a passive storage element.

The charging operation could use a DC to DC converter.

The respective durations of the charge and discharge operations could be based on operational parameters of the electrochemical energy storage system. The operational parameters could include: a temperature, a cell charging current value, a cell discharging current value, a cell voltage, an internal impedance, a internal battery pressure, a number of system charge/discharge cycles.

The charge and discharge operations could be are performed repetitively until a cell voltage threshold is met.

According to an aspect of the disclosure an electrochemical energy storage system includes at least one storage cell and circuitry for performing a charge and a discharge operation of said cell whereby said charge and discharge operations are performed internally to the electrochemical storage system.

In an embodiment the charge and discharge operations are performed between at least a first storage cell and at least a second storage cell.

In another embodiment the system contains a passive energy storage device and the charge and discharge operations are performed between at least a first storage cell and at least said passive energy storage element. The passive energy storage element could be a capacitor or an inductor.

The electrochemical energy storage system could contain a DC to DC converter and the charge operation could be performed using the DC to DC converter.

The system could contain a controller for determining the duration of the charge and discharge operations from the operational parameters of the electrochemical energy storage system. The system could contain circuitry for sensing the operational parameters of the system including: an internal battery pressure, a charging current, a discharging current, a cell voltage, an internal impedance, a number of charge/discharge cycles.

The charge and discharge operations could be performed repetitively until a cell voltage threshold is met.

Numerous scientific papers and publications teach that Li-ion battery capacity deterioration after a calendar life of more than 5 years, is not recoverable and the battery capacity fading is irreversible. Our experiments demonstrate that the lifetime of a battery may be extended significantly by maintain and/or restoring the capacity using pulsed charging/discharging, and/or energy juggling methods described above.

DESCRIPTION OF THE PREFERRED EMBODIMENTS

Figure 1A:
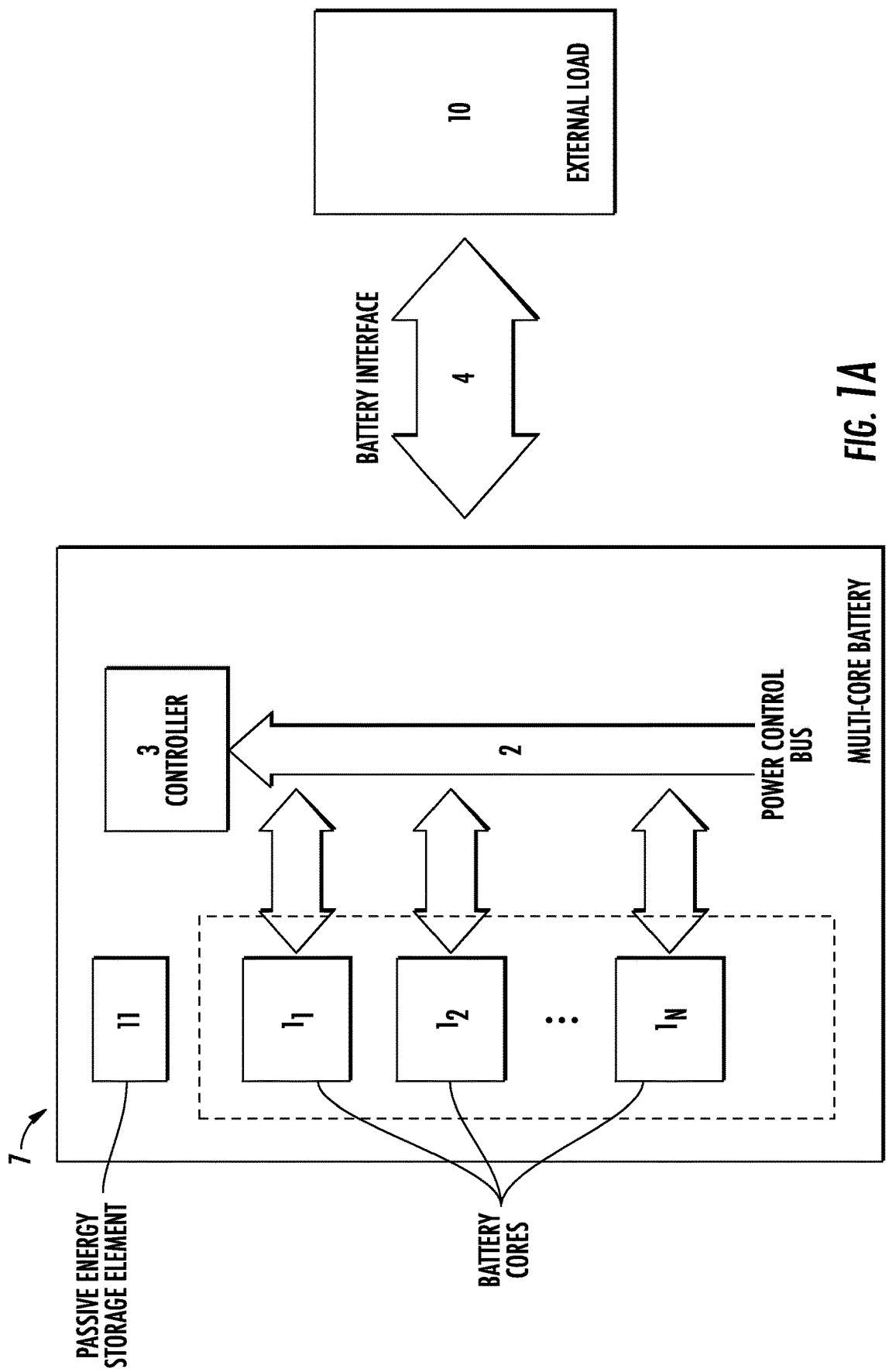
FIG. 1A is a block diagram of an exemplary Multi-Core Battery of the present invention.

The methods and systems described herein are applicable to a variety of Multi-Cell Batteries (MCB)(also referred to here as multi-core batteries) used currently for electric and plug-in hybrid cars, scooters, portable computers and tablets, portable power tools, uninterruptible power supplies, portable light sources, bi/uni-cycles, or other various portable electronic devices. It is to be understood that the methods and systems described here are not limited to the above battery types, but they are applicable to any multiple cell battery, or single cell battery, also referred to here as multiple core or single core batteries. Preferably, the battery types may include, but not limited to, nickel cadmium batteries, nickel metal hydride batteries, lithium batteries, or lead-acid batteries.

In this specification, the term 'static parameters' refers to, but is not limited to, the nominal battery voltage, nominal internal battery impedance, the nominal output current of an individual battery core into a standard load R, the age of the battery (calendar age and the remaining life), the ambient temperature, charge/discharge history of an individual battery cores, etc. Furthermore, in this specification the term 'operational parameters' describes actual operating values of the battery and includes the charging and discharging current, the charging and discharging voltage, state of charge of the battery, state of charge of individual cores, internal battery pressure, power, number of charge and discharge cycles. Other operational parameters may also be considered in the methods and apparatus described here.

The calendar life of a battery, may be extended significantly if the battery is charged and discharged using pulses rather than a continuous current. The calendar lifetime of a battery may be also be extended significantly if the duration of the charging, discharging pulses and/or the rest times between pulses of the cores in a MCB are selected based on the battery's static and operational parameters.

In this invention a procedure called 'energy juggling' is used to extend or recover a battery's capacity and lifetime. In energy juggling a battery is pulse charged and pulse discharged while it is idle and not supplying a load. In one embodiment of energy juggling, individual cores in an MCB are pulse-charged and pulse discharged from/to other cores of the MCB. In another embodiment of energy juggling individual cores in an MCB, are pulse-charged and pulse discharged from/to a combination of other cores and an internal passive energy storage device. In yet another embodiment of energy juggling individual cores in an MCB, are pulse-charged and pulse discharged from/to an internal passive energy storage device. In yet another embodiment of energy juggling the core of a single core battery is pulse-charged and pulse discharged from/to an internal passive energy storage device. The internal passive energy storage device may include but is not limited to a capacitor an inductor.

Energy juggling has a number of advantages. For example, it allows a battery to be stored at full charge without suffering the normal lifetime reduction associated with storage at full charge since periodic energy juggling during storage recovers lost battery lifetime and capacity. Energy juggling also allows the lifetime and capacity of a degraded battery or cores to be restored if, for example, the battery has been subjected to high temperatures or arduous cycling or other operations that degrade its capacity and lifetime.

The duration, shape and periodicity of the charge/discharge pulses used in energy juggling may be determined based on the operational parameters of the battery.

In a further embodiment of energy juggling, during the rest time between pulses, each core is subjected to 'mode reversal' wherein, after being discharged, the core is briefly charged for a prescribed, short period with a predetermined current applied, the rest period. In different embodiments the mode reversal is performed for portions of the rest period such as the beginning or end of the rest period, or it may be performed for the entire duration of the rest period.

Pulse Charge/Discharge

FIG. 1A is a block diagram of an exemplary Multi-Core Battery (MCB) of the present invention. MCB 7 contains multiple battery cores, $1_1, 1_2, \ldots 1_N$. Each battery core $1_1, 1_2, \ldots 1_N$ contains at least one battery cell (not shown). Battery cores $1_1, 1_2, \ldots 1_N$ may be connected in series or in parallel or in a series-parallel combination to provide the required output voltage, depending on the application. Battery core $1_1, 1_2, \ldots 1_N$ may consist of a single cell or may be self-sufficient batteries. Battery cores $1_1, 1_2, \ldots 1_N$. may have the ability to function independently, or in combination with other cores within the MCB 7. Battery cores $1_1, 1_2, \ldots 1_N$ connect to MCB controller 3 via power control bus (PCB) 2. PCB bus 2 may carry switch control signals, core and output voltage sense signals, current sense signals, temperature sense signals, internal pressure sense signals or other sense signals. Controller 3 monitors the status of battery cores $1_1, 1_2, \ldots 1_N$ and controls the operation of MCB 7. In one embodiment controller 3 is a microcontroller and includes a Central Processing Unit for processing instructions and data, on-board memory for storing instructions and data, a digital to analog converter for voltage measurement and drive circuitry for the control of switches. MCB 7 connects to external load 10 or a battery charger (not shown) through battery interface 4. MCB 7 optionally contains passive energy storage element 11 for the temporary storage of energy. In one embodiment passive energy storage element 11 is a capacitor, in another embodiment it is an inductor.

In some embodiments, the energy juggling operation of each battery core is controlled and monitored by controller 3. Controller 3 may monitor one or more of the following parameters: the charging/discharging current, cell voltages, battery temperature, internal battery pressure, battery voltage, mechanical stress, and state of charge. Other relevant parameters of the battery core may also be monitored if desired. Monitoring circuitry may include temperature, current control, pressure sensors, safety circuits, voltmeters, ammeters and other sensors (not shown), as needed.

In another embodiment, an MCB may have more than one controller whereby each controller monitors and operates one or more cores in the MCB. In still another embodiment, controller 3 may be implemented externally to MCB 7. Other variants of distributed control are also possible.

Figure 1B:
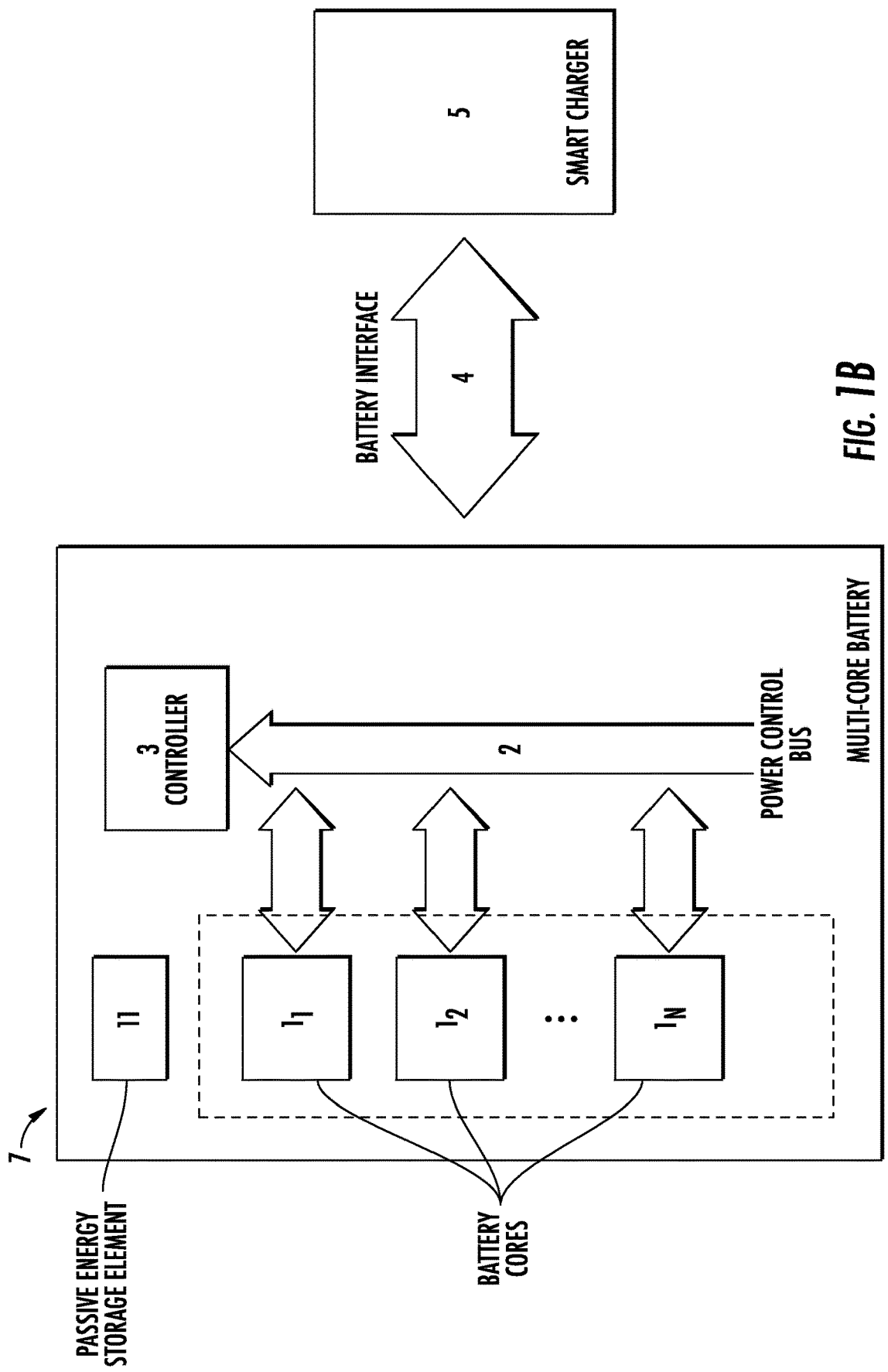
FIG. 1B is a block diagram of an MCB connected to a smart charger.

FIG. 1B is a block diagram of an MCB connected to a smart charger. In this embodiment controller 3 communicates with smart charger 5 over battery interface 4. In some embodiments control of the MCB 7 may be shared between the MCB controller 3 and the smart charger (SC) 6. The measurements are provided to smart charger 5 over battery interface (IF) 4.

Figure 1C:
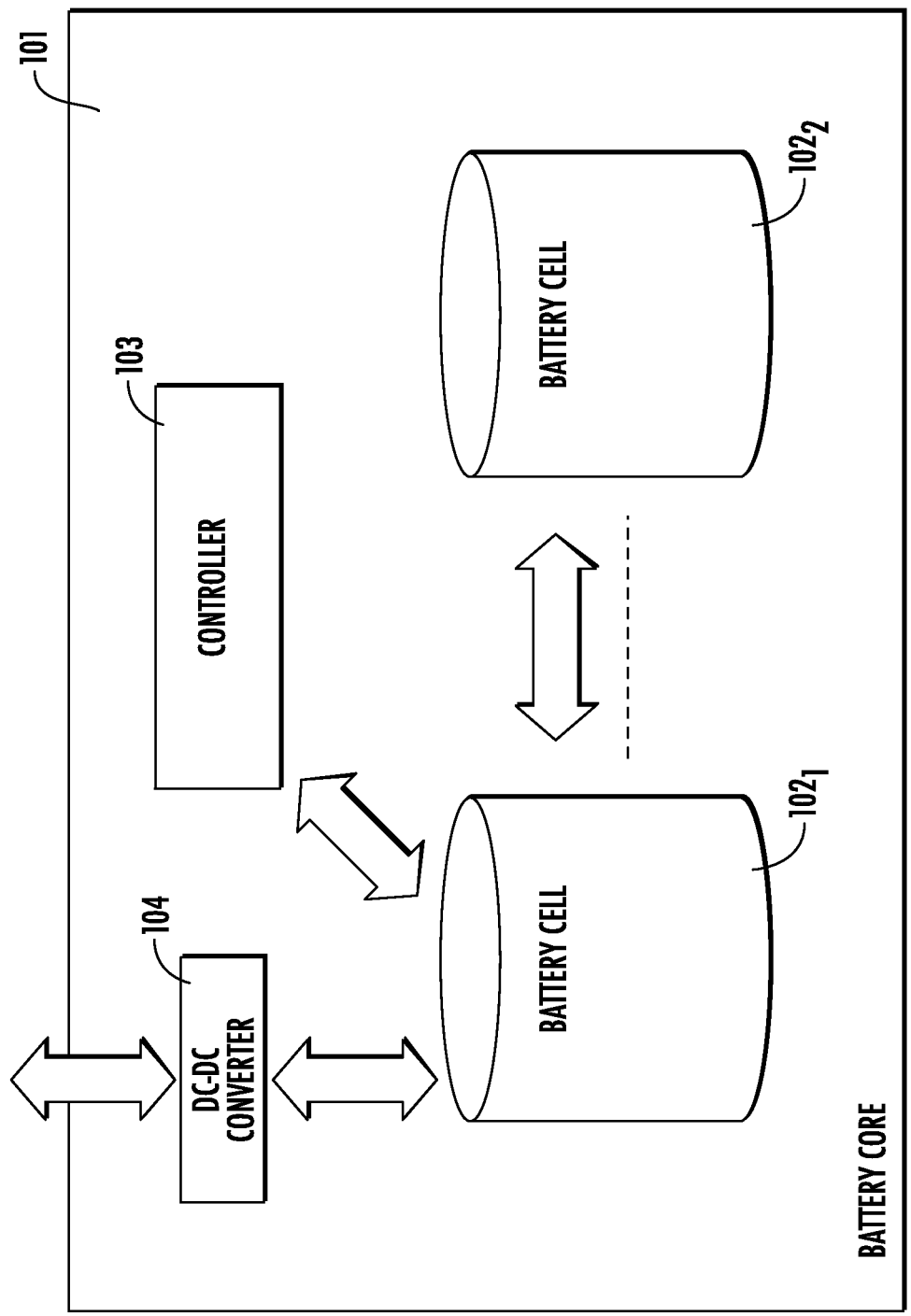
FIG. 1C is a block diagram of an example battery core.

FIG. 1C is a block diagram of an example battery core. Battery core 101 contains battery cells $102_1$ and $102_2$ for energy storage. Core controller 103 controls the operation of cells $102_1$ and $102_2$. Battery core 101 optionally contains DC to DC converter 104 for the conversion of the voltage of cells $102_1$ and $102_2$ to a DC level.

In other embodiments, the control of the cores may be implemented entirely in the SC 6, In this case SC 6 also monitors and operates the MCB. Hybrid configurations are also possible, where some cores have their own controller 3 and the SC 6 controls the functionality of the reminder of the battery cores which are not controlled by controller 3.

In another embodiment MCB controller 3 detects the usage pattern of MCB 7 including its charge and discharge pattern and determines when to charge the MCB 7 to a 'vacation level' charge. The vacation level is defined here as the level of charge at which the battery may be stored for a long period without significant use without causing major capacity degradation. Once at vacation level, the MCB controller 3 will then decide, based on the detected usage pattern, the best time to charge the stored battery to full capacity. This delay of full charging until required may substantially improve battery lifetime. This similar optimization of charge levels is not restricted to MCBs and can also be used with single core batteries.

In another embodiment, the MCB 7 is not rechargeable and each core is a disposable battery and no energy juggling is performed inside the MCB 7. The discharging cycle may be performed in a continuous mode, when all cores are discharged in parallel, or in a pulse mode, when discharging of each core is done during an assigned time slot. The time slots are assigned by the MCB controller 3. Discharging time slot durations are dependent on the energy demand of the external load and current condition of each non-rechargeable battery core. The pulse discharge mode reduces the polarization effect, while individual adjustments of discharge timing compensate for variations in depletion/diffusion processes attributable to the manufacturing process. When a core becomes unusable, the MCB controller 3 may indicate which core has to be replaced or serviced.

When charged from an external power source, each battery core, or group of cores, may be connected to the external power source for short periods of time. Duration and periodicity of the charging pulses is optimized according to: the design parameters of the battery core, individual history of each battery core or group of cores, individual state of charge of each battery core or group of cores, operational factors, and estimated internal impedance of the battery core. Other parameters may also be taken into consideration. One of such parameters might be the charging current value measured during different parts of a charging pulse. It is beneficial to measure the charging current value during the first portion of charging pulse and later during the second portion of charging pulse. Multiple charging current measurements (more than two) performed during the charging pulse would allow even better accuracy of accessing the current state of charge of each individual battery core, or group of battery cores.

In still another embodiment, multiple MCB 7 communicate with each other, and use a central controller (not shown).

Battery cores that are affected by aging, capacity deterioration and physical degradation, can be withdrawn from use in various ways. For example when all available battery output current is required, the cores are connected in parallel. However, in some routine energy delivery modes, the weak cores may be left aside to recover. The weak cores still participate in energy juggling process in order to recover their charge storage capacity. Finally, when a core becomes unstable and dangerous to be actively used, the MCB controller 3 disconnects the core from the MCB activity.

In another embodiment, the MCB 7 uses a variable number of battery cores during the charging and discharging processes. For example, when a smaller amount of energy needs to be stored in the battery, MCB controller 3 can decide to use only part of its battery cores. The unused cores are kept at low charge "vacation" levels and continuously maintained through the energy juggling mechanism. A smart charger 6 communicates with the MCB controller 3 to negotiate the timing and the duration for the charging pulses. Such usage model might be beneficial in cases where energy costs are high and usage of all battery cores would require purchasing of more energy than necessary. The unused battery cores benefit from low charge levels, significantly lower compared to current industry recommended storage charge levels. Currently recommended "vacation" levels for Li-ion batteries are 3.6V to 3.8V. An MCB using energy juggling however, might allow unused cells to be kept under 3.1 to 3.4V without affecting the battery cell calendar lifetime.

Similar approach could be used when only a small amount of energy (compared to the overall energy already stored in the Multi-Core battery) is requested by the load. In such case, only limited number of battery cores (may be just one) participate in the discharge process.

Figure 2:
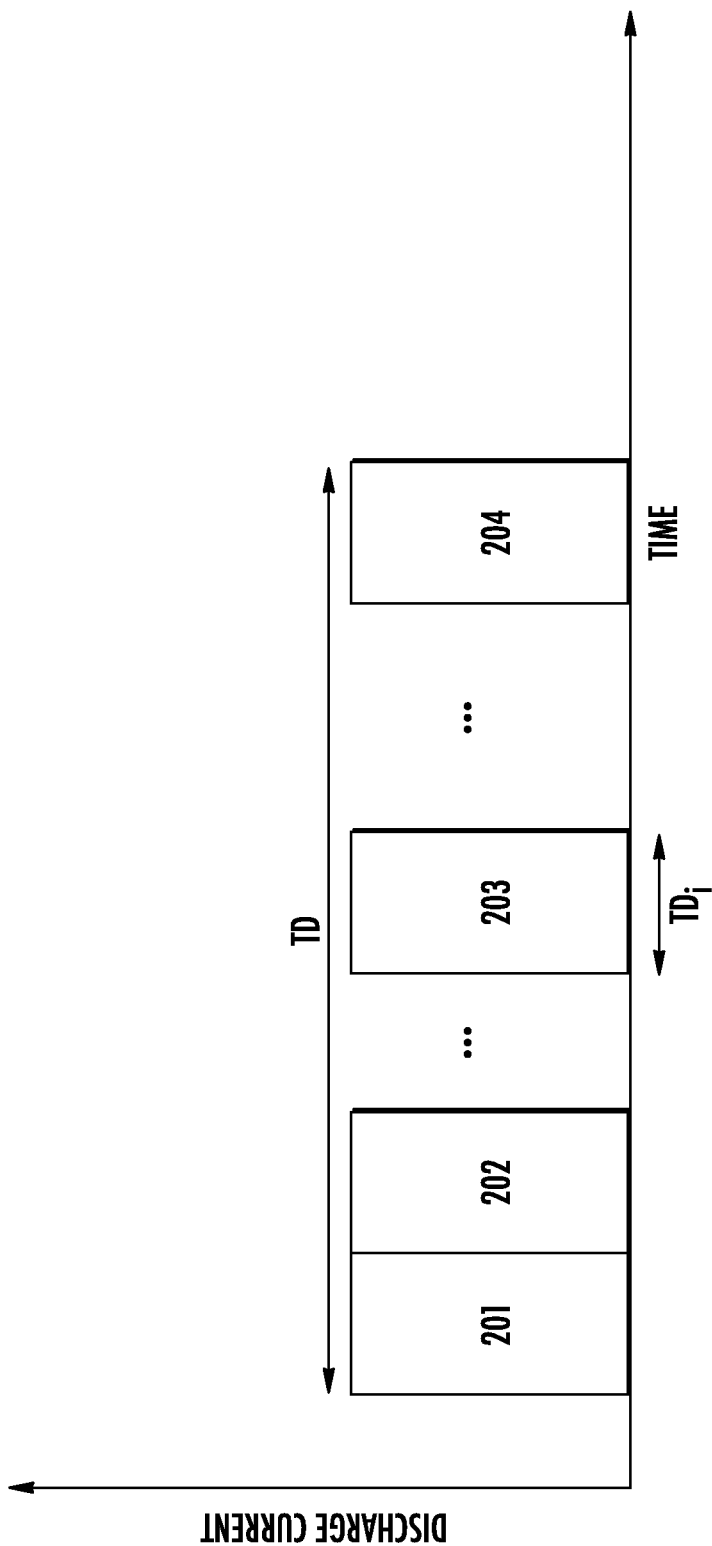
FIG. 2 is an exemplary discharge timing diagram.

Energy juggling involves the charge and discharge of individual battery cores in an MCB or the charge and discharge of the single battery core of a single core battery. FIG. 2 is an exemplary discharge timing diagram. It shows the discharge timing for the N cores $1_1$-$1_N$ of MCB 7. During a first period 201, the battery core $1_1$ is discharged while all, or some, other cores $1_2$-$1_N$ are resting. During a second period 202, the battery core $1_2$ is discharging while all, or some, other cores are resting, and so on. During time period 203 battery core $1_1$ is discharged while all or some cores are resting. Finally, during time period 204 battery core $1_N$ is discharged while all or some cores are resting. For the general case when the MCB 7 has N cores, the total discharge period is defined as 'TD' and the discharge time for core i is denoted as 'TDi', where i∈[1–N]. The term 'discharging-to-rest time ratio' (DTR) is used for the ratio between the discharge and rest times for a core and is given by the formula $$DTR=TDi/(TD-TDi).$$

A similar approach may be used for charging the cores of the multi-core battery (MCB) 7. The total charging time for all battery cores in MCB 7 is denoted as 'TC'. The charging time for core i is denoted as 'TCi', where i∈[1–n]. The term 'charging-to-rest time ratio' CTR is used for the ratio between the charging and rest time of a core and is given by the formula $$CTR=TCi/(TC-TCi).$$

While FIG. 2 shows equal discharge times for all cores, the charging and discharging durations for individual cores can be different in some embodiments. Pulses of different duration may be used for the same core.

Figure 3:
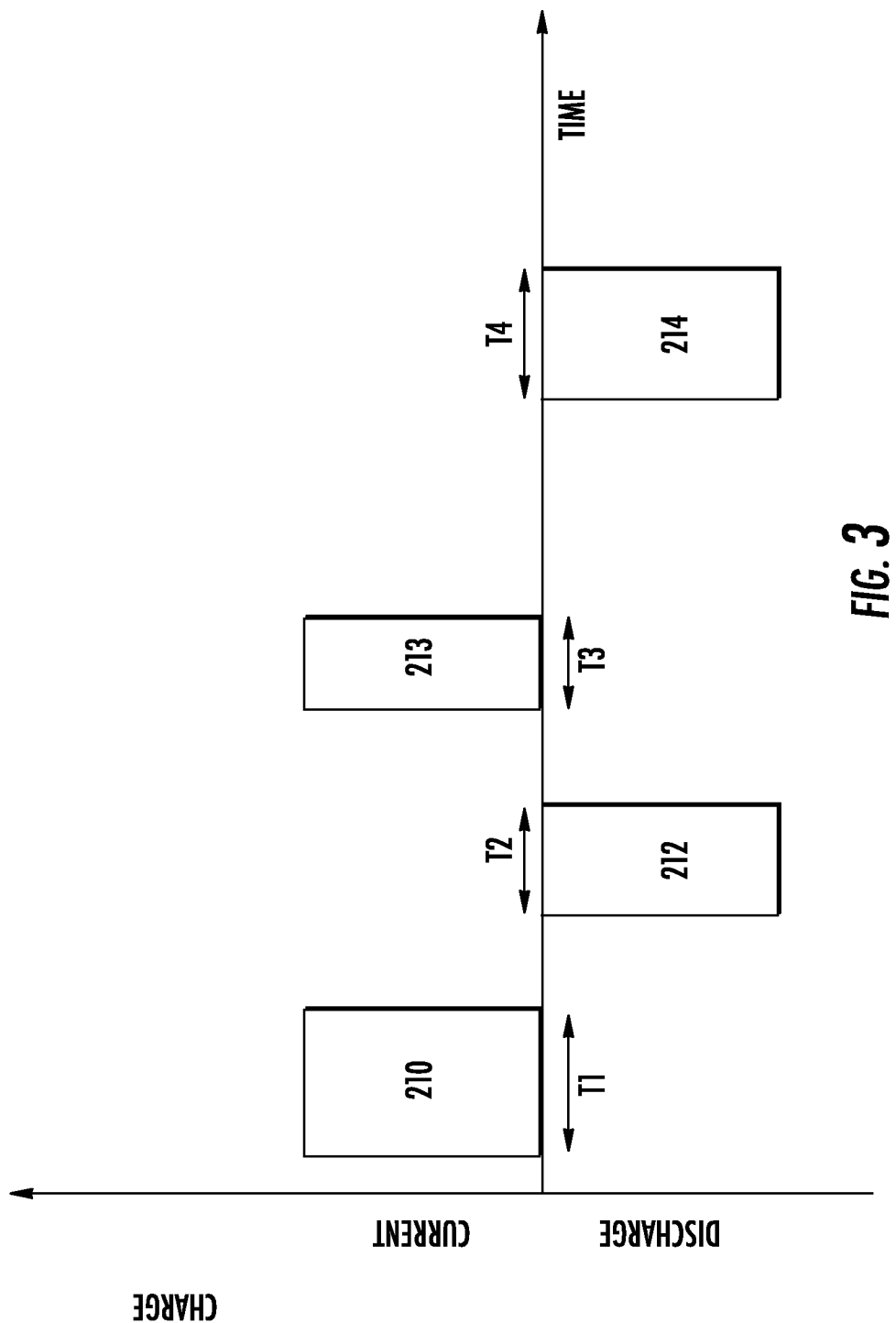
FIG. 3 is an exemplary timing diagram for charging and discharging of a core.

FIG. 3 is an exemplary timing diagram for charging and discharging of a core. There is a first charge period 210 with pulse duration T1, followed by a first discharge period 212 with a pulse duration T2, followed by a second charge period 213 of duration T3, and finally a second discharge period 214 of duration T4. Using charge and discharge pulse durations of differing values is advantageous for the battery health in some applications.

In one embodiment, the durations of TDi and TCi are adjusted according to the state of charge of the i-th core. For example when core i has a low state of charge the duration TCi is increased.

In general, the DTR ratio and/or CTR ratio for each core is adjusted depending on the battery's static parameters and operational parameters.

Referring to FIGS. 1A and 1B, the smart charger 6, or the core controller 3 may determine the individual adjustments for each battery core. The smart charger 6 can also devise individual adjustments for groups of battery cores.

The charging energy for energy juggling may be supplied from smart charger 6.

Alternatively, the charging energy may be obtained from another core from within the MCB 7. In another embodiment, the charging energy for one core gets stored temporarily in an intermediary energy storage device and is supplied to another battery core via a DC/DC converter. In another embodiment, depending on the source used for charging the cores, i.e. one of the battery cores, or an external source), MCB 7 may be equipped with an ultracapacitor, as to absorb a portion of the charging energy provided by the charging source. This portion of charging energy is then delivered to a load during the rest time.

By varying the duration, periodicity and shape of the charging pulses, various charging patterns may be selected to optimize the charging time for a specified core, or to optimize the battery calendar life, or to optimize the battery capacity.

Energy Juggling

As indicated above, energy juggling can reduce the energy losses and improve battery lifetime and capacity. The duration, shape and periodicity of the charge/discharge pulses may be adjusted depending on the actual state of charge of each battery core. In one embodiment, after a battery has been charged to a pre-established state of charge during a charging cycle, the charging cycle is stopped and energy juggling begins.

In other some cases, the energy juggling process may be started from the beginning of the MCB charging process.

In one embodiment of energy juggling, energy is pumped from one battery core to another battery core inside the MCB, such that the energy remains within the MCB. Energy juggling can occur not only when the battery is idle (not discharging into a load) or also when it is discharging into a load.

For example, in an MCB when a first core is discharging into the load, two other cores discharge a short current pulse into a fourth core. Thereafter, the most recent charged fourth core discharges into the load. During this discharging period the first discharged core is charged by a short high voltage pulse supplied from a newly configured group of two or more battery cores. The process is repeated so that each battery core gets periodically pulse charged and pulse discharged for a short period of time.

During energy juggling, a selected battery core can be charged with short pulses from one or more other cores of the MCB. A selected core can also be discharged into another core. A battery core can be connected in parallel with other cores, or in series with other cores. In some embodiments current pulses are delivered from one battery core to another via an intermediate energy storage device, such as a capacitor. In another embodiment, a DC/DC converter is used to accommodate the charging voltage requirements.

In one embodiment a pulse duration 0.5 sec and pulse amplitude of 2-3 Amperes is used. It should be understood that pulse duration, periodicity, amplitude and shape could be different for each type of battery cell or group of battery cells. The duration periodicity, amplitude and shape of periodic pulses can be determined based on operational parameters of the battery.

Energy juggling involves charging/discharging the cores in a MCB in a certain order. Different numbers of battery cores may be used during the charging and discharging cycles. It is also possible to combine the battery cores into groups and to charge/discharge more than one battery core at a time. For example, during some energy juggling periods a group of 2 cores may charge a third core; then, a group of 3 cores may charge a group of two cores; thereafter, a group of 5 cores may charge a group of 3 cores, and so on. The battery cores may participate in different groups and as such, are exposed to different charging/discharging currents which further improves battery lifetime.

Figure 4:
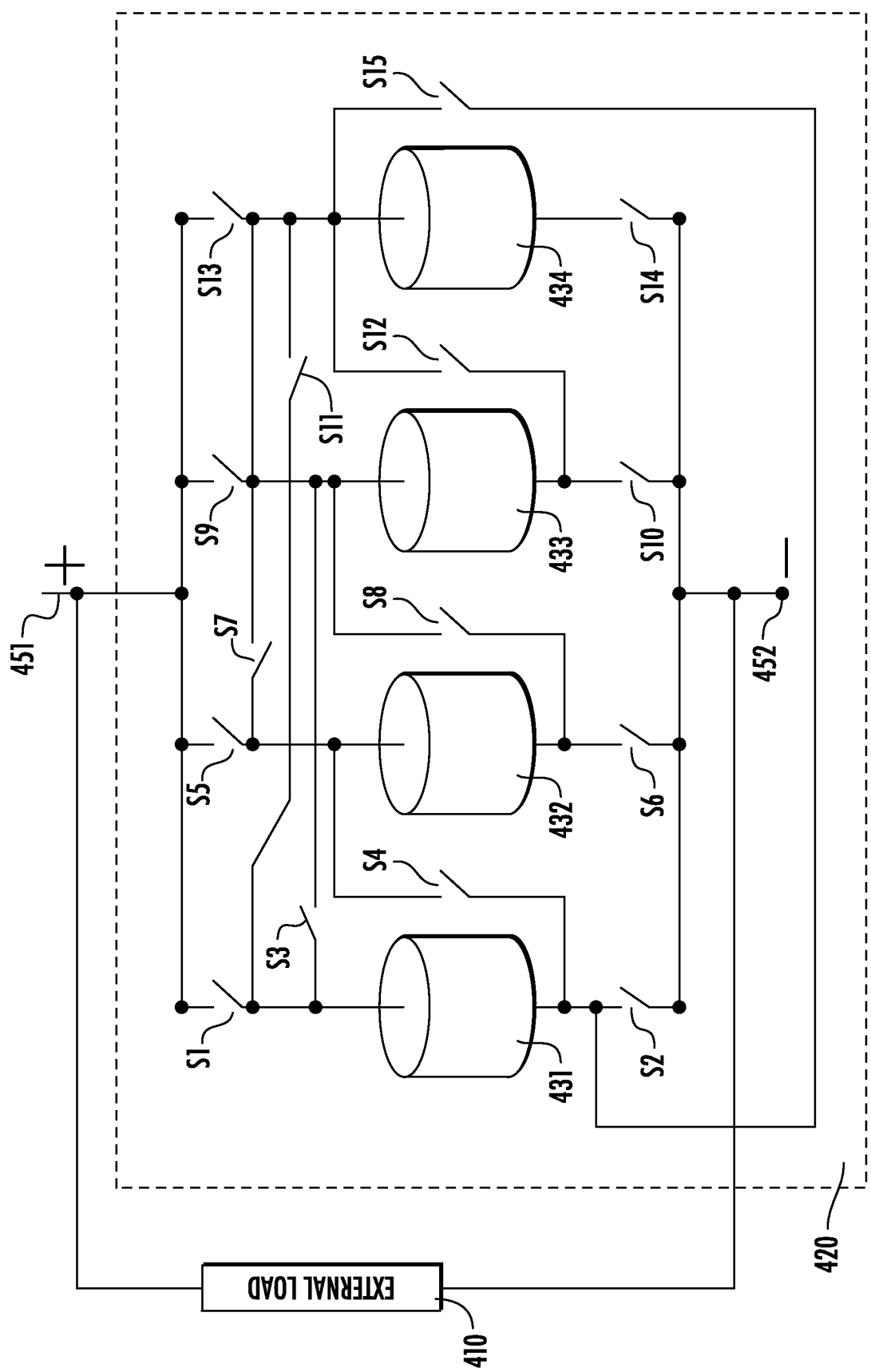
FIG. 4 is a schematic diagram of an exemplary switching network for a four-core battery.

The configuration shown in FIG. 4 is used to describe one embodiment of the method for extending the calendar lifetime of the batteries using pulse charging and discharging technique, called "energy juggling". In this example, each battery core includes at least one of: nickel cadmium, nickel metal hydride, lithium, lithium-ion or lead-acid battery.

FIG. 4 is a schematic diagram of an exemplary switching network for a four-core battery. MCB 420 contains four Li-ion battery cores 431, 432, 433, 434 and has a nominal charge storage capacity C. MCB 420 connects to external load 410 through output terminals 451 and 452. A plurality of switches S1 . . . S15 are used to configure the battery into multiple charging/discharging configurations. Other components of the MCB such as the controller and buses are not shown for clarity.

Table 1 shows the state of the switches S1 . . . S15 corresponding to three controlled pulse charge/discharge modes.

TABLE 1

| | | | | | | | Switch # | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | Battery Mode |
| 1 | 1 | 0 | 0 | 1 | 1 | 0 | 0 | 1 | 1 | 0 | 0 | 1 | 1 | 0 | 1) Battery delivers 3.7 V with current up to 4 × 2C = 8 C (C has a numerical value for a core capacity) when discharging. All cores charging in parallel when charging |
| 1 | 0 | 0 | 1 | 0 | 0 | 0 | 1 | 0 | 0 | 0 | 1 | 0 | 1 | 0 | 2) Battery delivers 15.1 V with current up to 2C. Charging is running with all cores in series. Voltage levelling required. |
| 0 | 0 | 1 | 1 | 0 | 1 | 0 | 0 | 0 | 1 | 0 | 0 | 1 | 1 | 0 | 3) Core 434 is connected to outside and can be charged from a charger or discharged into a load. Output voltage is 3.7 V. Cores 431, 432 are connected in series and provide 7.4 V discharge into core 433. Cores 431, 432, 4333, are all disconnected from outside. |

By changing the configuration for switches S1 . . . S15 the battery can be configured to additional multiple modes similar to Mode 3, but with other pairs of battery cores discharging to a third core while another core is connected to an outside load 10. To avoid providing repetitive information we are not describing such modes. Preferably, each mode configuration is maintained for a very short period of time. We have tested time periods between 50 msec to 2 sec, but these periods can be longer depending on the state-of-charge of both the charging and discharging cores.

Different types of switches S1-S15 may be used for the high side (coupling to output terminal 451 and the low side (coupling to output terminal 452) switching to minimize losses during storage. If same type of switches are used, the voltage level V1 to which a first battery core 431 is charged by a second partner battery core 432, and the voltage level V2 to which the first battery core is then discharged to a third partner battery core 433, may be optimized to minimize overall energy losses.

Other arrangements may be used taking into account various factors relevant to charging/discharging requirements and core status. Timing, duration, and pulse shape for charging a battery core by its partner battery cores can vary depending on the state-of-charge, the health status of each core and other operational parameters. Discharging of battery cores into external load 410 can be done according to a pre-established rotation. In such a case, current is constantly provided to an external load 410.

As an example, for a Multi-Core Battery with 230 battery cores forming a 120V battery, the output voltage may be adjusted in increments of one cell voltage, or 3.7 V. As mentioned above, for the highest output current and lowest output voltage, all battery cores are connected in parallel.

Due to the fact that the battery cores are practically never connected in parallel for long periods of time, there is no need to pre-match their internal resistances, as usually done when battery cores are assembled in an MCB. As the internal resistance of cores change in time, the cores become quite different from each other. The monitored differences in battery cores may be compensated by a variable number of battery cores grouped for charging and discharging during the energy juggling process. Similar timing and group adjustments are done during pulse charging and pulse discharging as described in connection with FIG. 3.

Each core of MCB 7 may be equipped with an individual controller and a safety switch to deal with external factors like temperature, overload, pressure, etc. The individual core controllers communicate through a bus such as PCB bus 2 in FIG. 1A to control switches S1-S15. The cores may have voltage and current sensors which may be controlled by a MCB controller 3 in FIG. 1A, or from outside the MCB, by charger 6 in FIG. 1B. Switch and battery core control may be also done through a wireless channel such as Bluetooth, WiFi, specialized UHF communications, conventional RF communications or NFC communication.

It has also been observed that with periodic energy juggling, a Li-ion battery maintains almost a constant capacity even when operating at elevated temperatures of +55° C. for 3 months. The results showed full restoration of the battery's nominal capacity by energy juggling.

FIGS. 5-8 illustrate various circuits that may be used for energy juggling between two battery cores via a capacitor.

Figure 5:
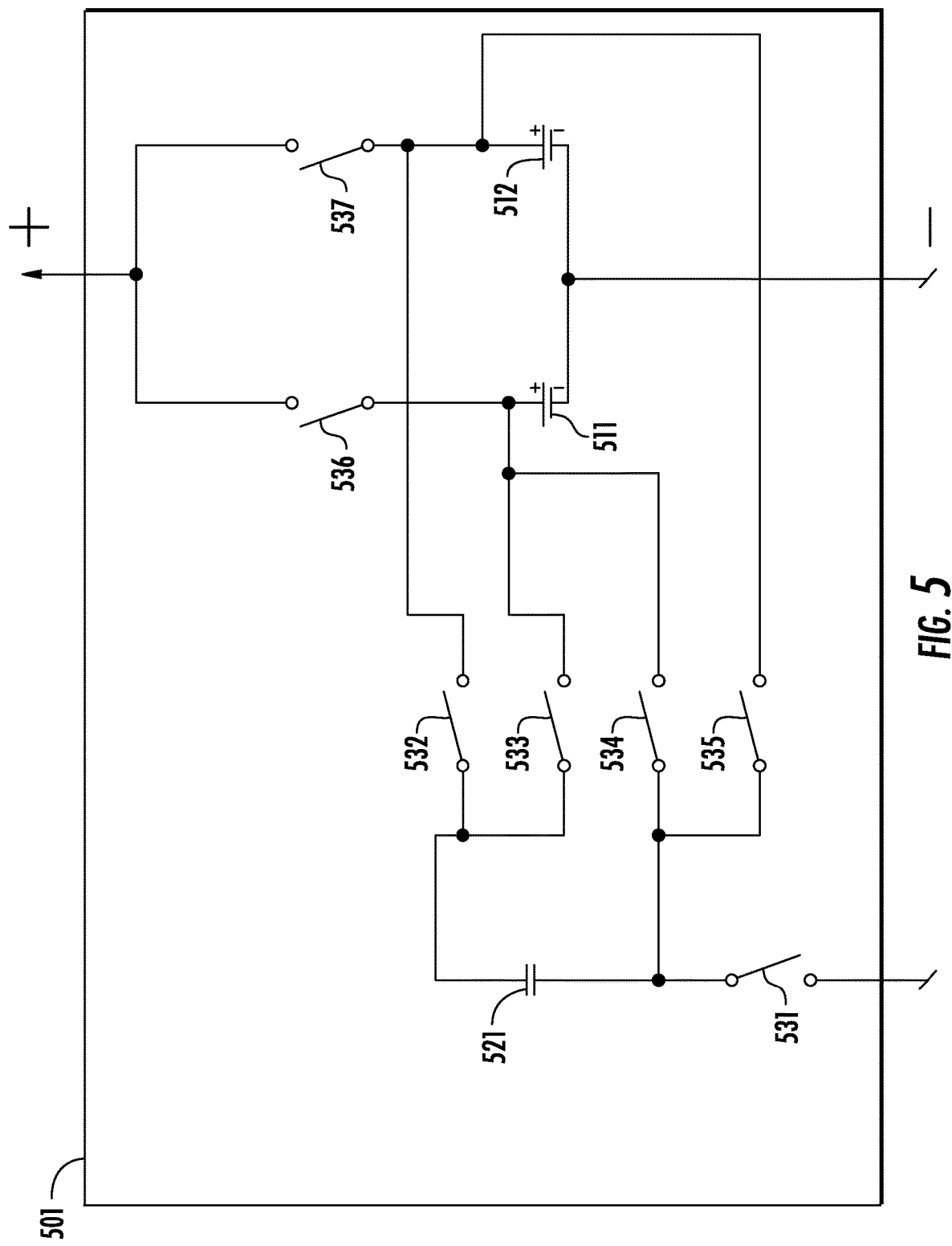
FIG. 5 is a schematic diagram of an exemplary energy juggling circuit.

FIG. 5 is a schematic diagram of an exemplary energy juggling circuit. Circuit 501 contains battery cells 511 and 512, capacitor 521 and switches 531, 532 . . . 537. Capacitor 521 is sequentially connected to battery cells 511 and 512 for controlled periods of time using switches 531 to 537 to perform charging and discharging of battery cells 511 and 512.

Capacitor 531 may be a ceramic or electrolytic capacitor; other types of capacitors, or combinations thereof may also be used. The use of a super-capacitor (ultra-capacitor) is also possible. Furthermore, groups of capacitors could be used instead of one capacitor. Charge could be transferred to an individual capacitor or group of capacitors dedicated to each battery cell or each group of battery cells or batteries involved into the energy juggling process.

A rechargeable battery may be used for performing the temporary energy storage function of the capacitor. Such a battery may be used as a temporary energy storage, subsequently transferring energy between battery cells, or groups of battery cells, or batteries. The combination of a capacitor and a battery is also possible for such temporary energy storage purposes. An inductor may also be used as a temporary energy storage device and perform a similar energy transfer function.

When connected parallel to battery cell 511, for a first controlled period of time, capacitor 521 is first charged to a voltage level Vcap, while 511 is discharged by a controlled amount of energy. The amount of energy is controlled by adjusting the first period of time during which 521 is connected parallel to cell 511. Thereafter, 521 is connected in series with cell 512 having a voltage Vcell2 and the voltage across 521 reaches a combined value (Vcell2+Vcap) sufficient to support the charging of 511. This second charging of the capacitor 521 is performed for a second controlled period of time. During this second period of time, a portion of the charge previously obtained from capacitor 521 and a portion of the charge from battery cell 512 are transferred to battery cell 511. The second period of time may be adjusted whenever the transferred amount of energy needs to be adjusted.

Instead of a single current pulse as described above, multiple current pulses could be used. In one embodiment, each energy transfer consists out of multiple current pulses each of which has an adjustable duration, amplitude and shape. In some cases, it is beneficial to perform the energy transfer with current pulses of varying duration, shape and amplitude.

Similarly, the energy juggling process may be performed starting with battery cell 512 initially discharged onto capacitor 521 and then charged back from capacitor 521 coupled in series with battery cell 511.

Figure 6A:
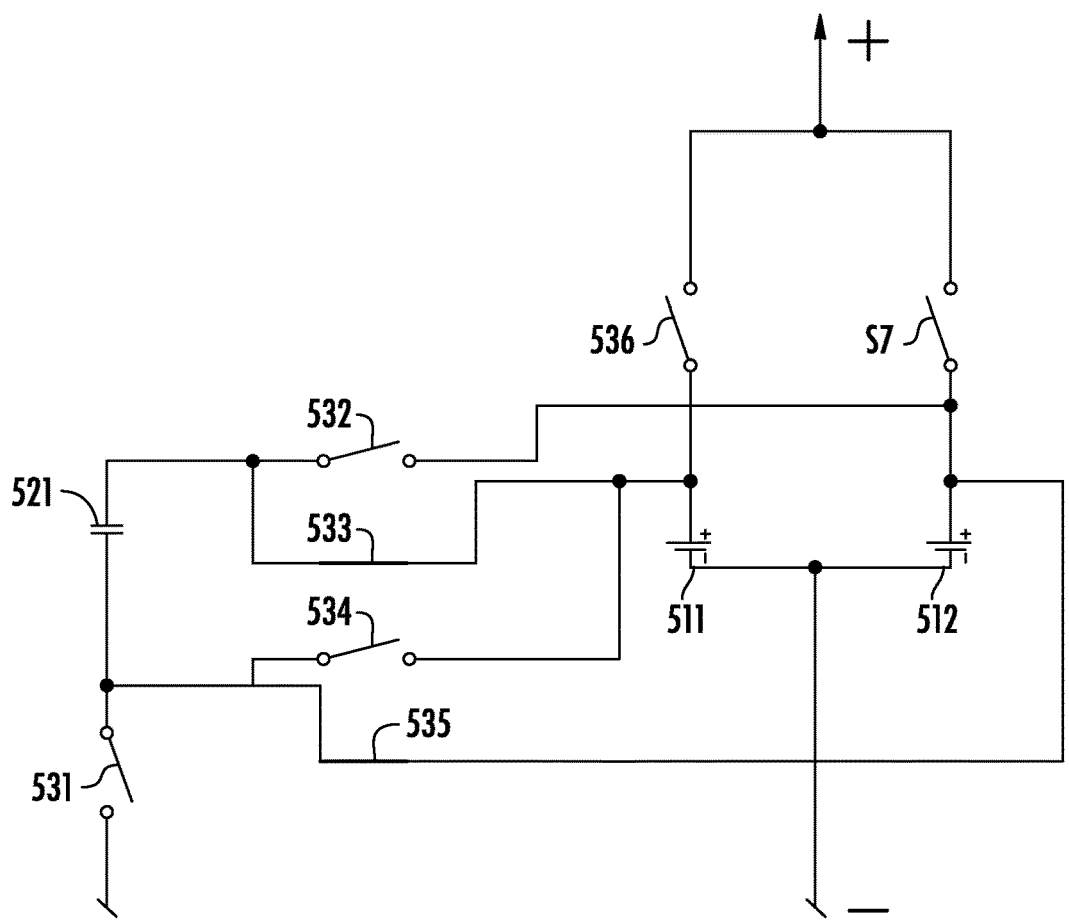
FIG. 6A is a schematic diagram of an exemplary energy juggling circuit configuration.
Figure 6B:
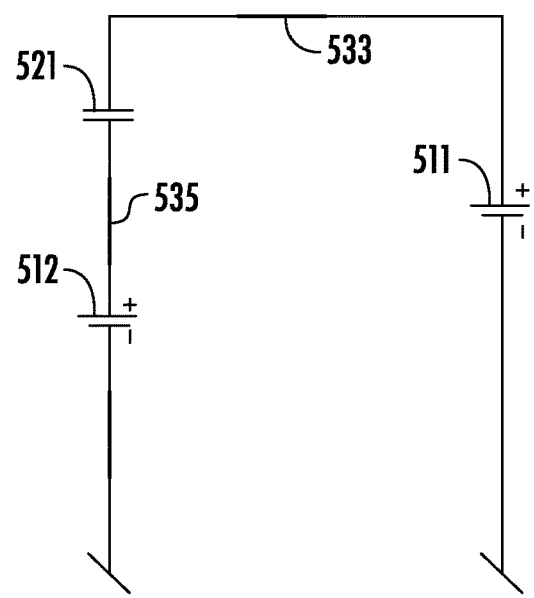
FIG. 6B is a simplified circuit diagram of FIG. 6A.
Figure 7A:
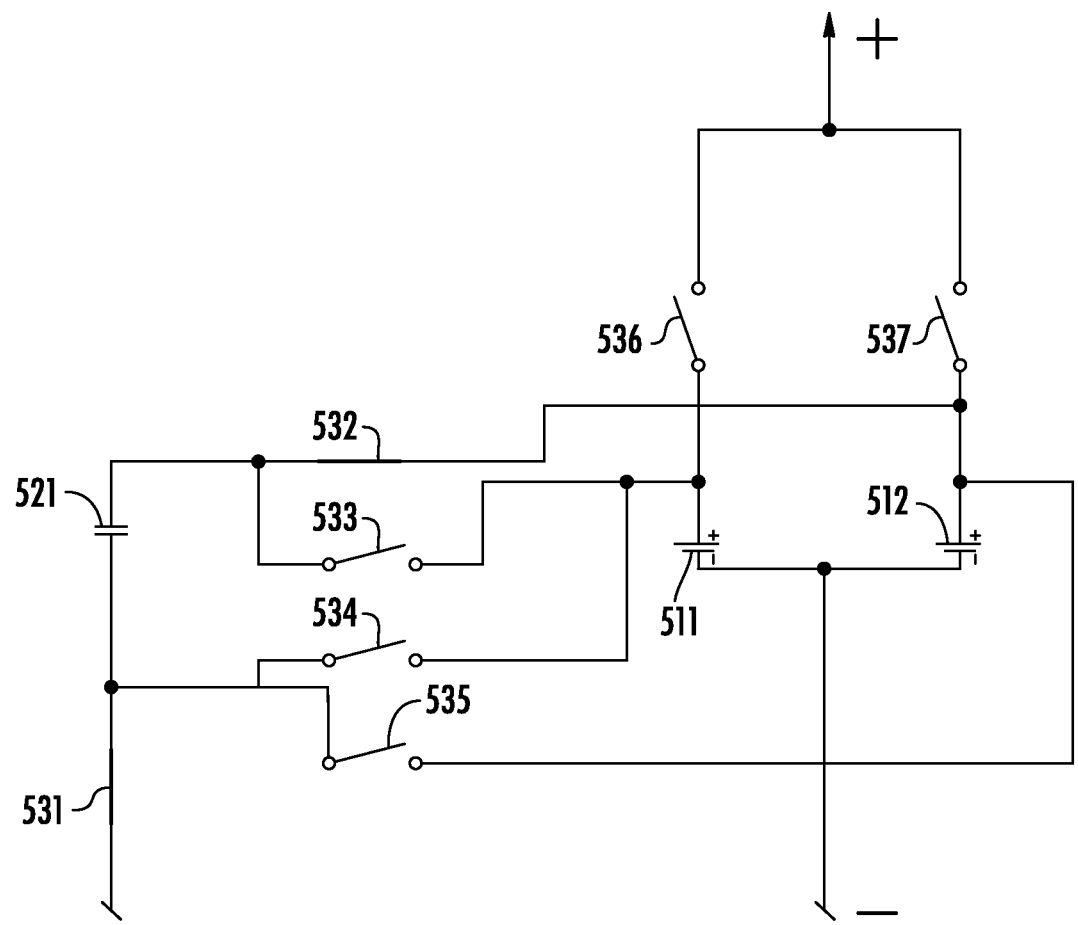
FIG. 7A is a schematic diagram of another exemplary energy juggling circuit configuration.
Figure 7B:
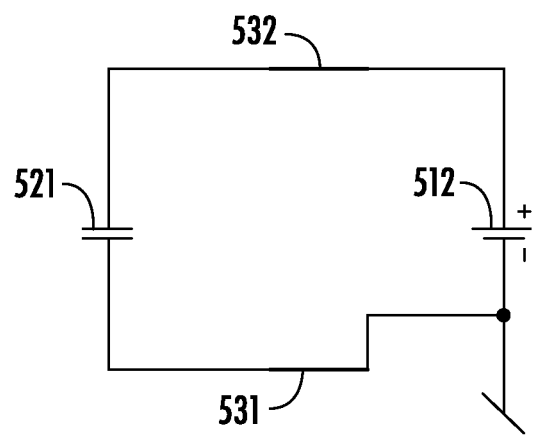
FIG. 7B is a simplified circuit diagram of FIG. 7B.
Figure 8:
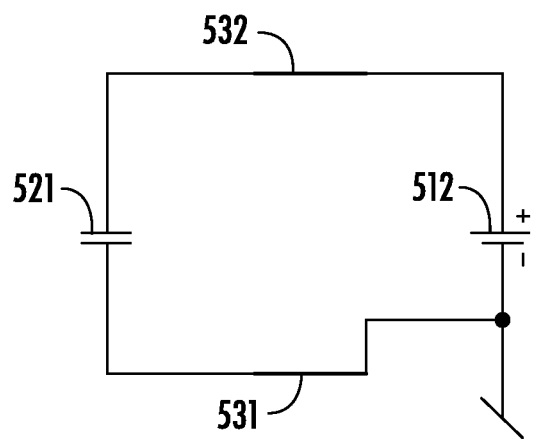
FIG. 8 is a schematic diagram of another exemplary energy juggling circuit connection.

A number of possible energy juggling circuits may be configured through switches 531 to 537 as further shown in FIGS. 6, 7 and 8. FIG. 6A is a schematic diagram of an exemplary energy juggling circuit connection. Switches 531, 533 and 535 are closed, capacitor 521 is connected in series with cell 512 for charging cell 511. FIG. 6B is a simplified circuit diagram of FIG. 6A. FIG. 7A is a schematic diagram of another exemplary energy juggling circuit connection. Switches 532 and 535 are closed, capacitor 521 is connected parallel to cell 512 and is charged by cell 512. FIG. 7B is a simplified circuit diagram of FIG. 7A. FIG. 8 is a schematic diagram of another exemplary energy juggling circuit connection. Switches 531 and 532 are closed and capacitor 521 is charged by cell 512.

Figure 9:
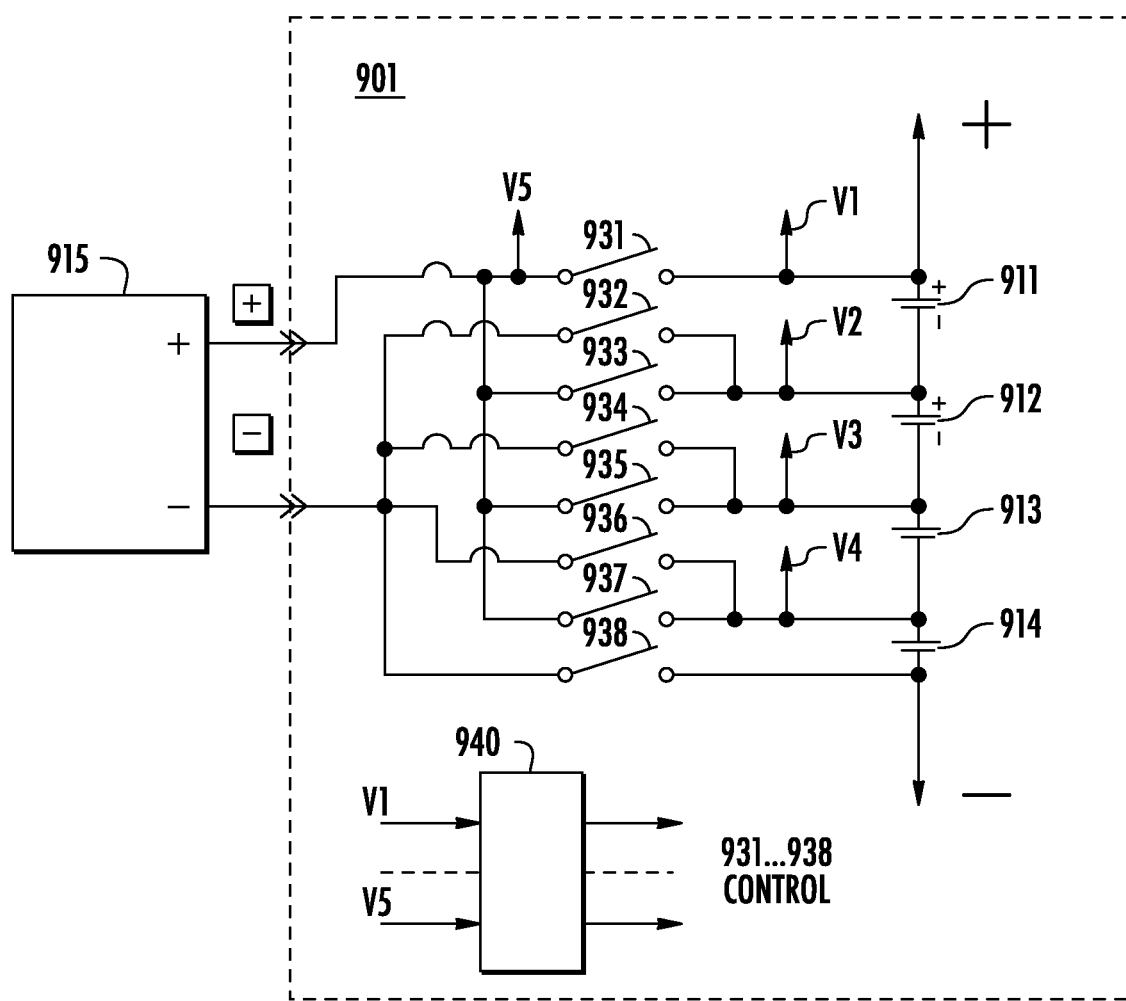
FIG. 9 illustrates an energy juggling circuit for a four-core battery using an external power supply.

FIG. 9 is a schematic diagram of an exemplary energy juggling circuit for a four cells MCB. Cells 911 to 914 in MCB 901 are charged from external power supply 915 via switches 931 to 938 controlled by microcontroller 940. Voltages and currents for cells 911 to 914 are measured and communicated to microcontroller 940. Monitoring of only voltages may be sufficient in some cases. Based on the recorded history of measurement results and/or the most recently measured values, microcontroller 940 decides the timing, shape and amplitude for the charging pulses for each battery cell. Each cell is charged for a period of time (Tcharge) followed by a time rest (Tpause). During (Tpause1) corresponding to the rest time of battery cell 931, the other batteries 932, 933, 934 are charged. For battery 931, $$Tpause1 = Tcharge2 + Tcharge3 + Tcharge4 + Tadd$$

Figure 10:
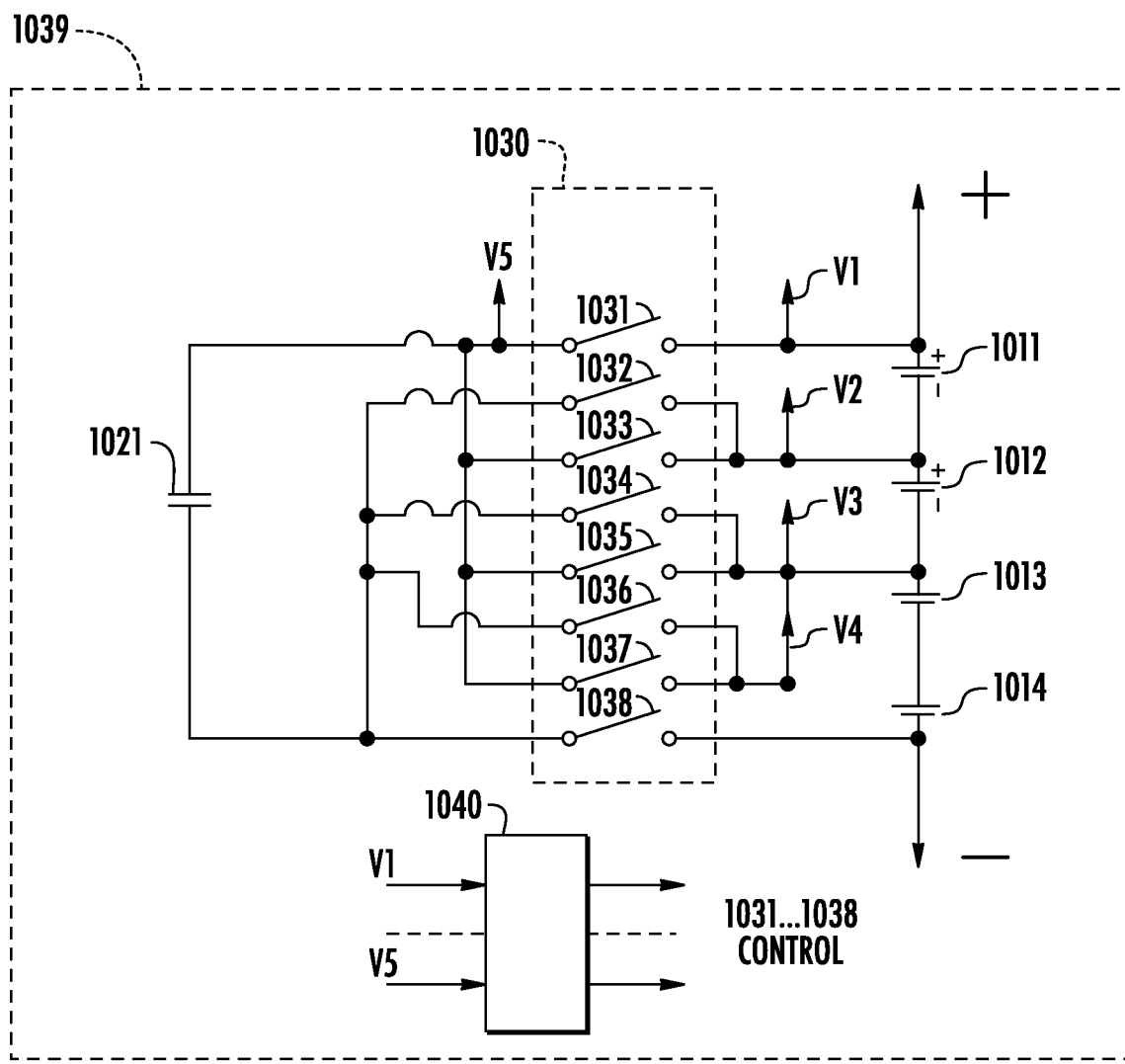
FIG. 10 illustrates an exemplary energy juggling circuit for a four core MCB that uses a capacitor.

Tadd is an optional additional time if the battery, or a group of cells, needs extra time to relax after absorbing the energy delivered by the charging pulse. Microcontroller 940 may change as required the values of Tcharge1 to Tcharge4 and Tadd according to the actual state-of-charge and health status of each battery, as well as its history of charging/discharging cycles FIG. 10 illustrates an exemplary energy juggling circuit for a four core MCB that uses a capacitor. MCB 1039 includes capacitor 1021, switch array 1030, controller 1040 and battery cells 1011 to 1014. Capacitor 1021 is charged from selected battery cells 1011 to 1014 through switching array 1030 and discharged to selected battery cells 1011 to 1014 through switching array 1030. Switching array 1030 consists of switches 1031 to 1038. When discharging capacitor 1031, in some embodiments, capacitor 1021 is connected in series with at least one of cells 1011 to 1014 by switching array 1030, such that the combined voltage of the series combination is higher than the voltage of the cell selected for charging. The configuration of switching array 1030 is controlled by controller 1040. Controller 1040 receives as inputs measurements of the cell voltages (shown as V1, V2, V3 and V4 in FIG. 10). Although capacitor 1021 is shown as internal to MCB 1039 in other embodiments capacitor 1039 is an external capacitor.

In another embodiment, a DC/DC converter is used to develop the charging voltage. In this embodiment, there is no need for a storage device such as capacitor 1021 to connect in series with another battery cell to create the charging voltage. When the DC/DC converter is used, one battery cell may be connected to another battery cell via the DC/DC converter without using an intermediary energy storage device. The DC/DC converter can be controlled to provide the necessary higher charging voltage.

Figure 11:
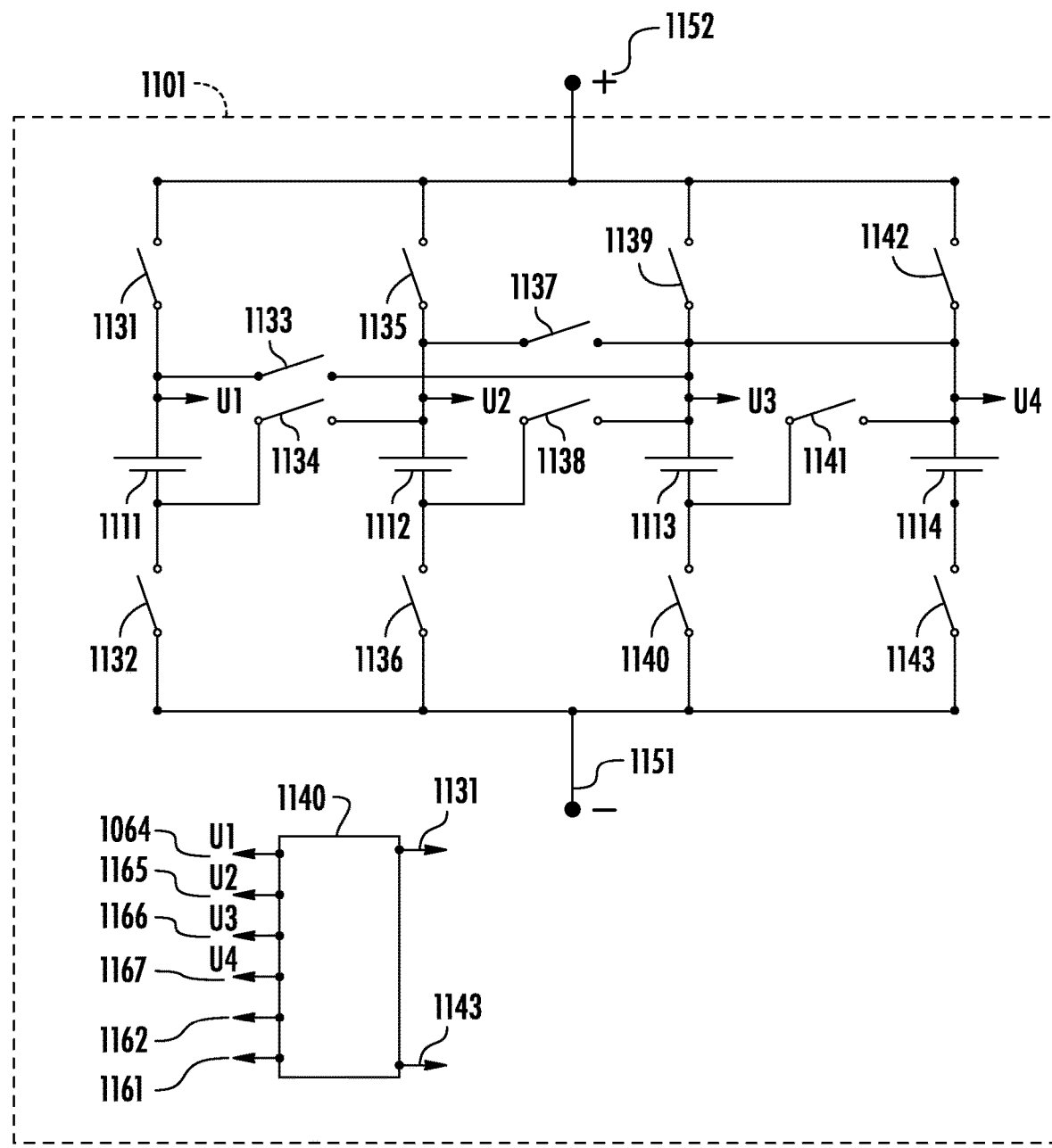
FIG. 11 is a schematic diagram of a variable voltage MCB.

FIG. 11 is a schematic diagram of a variable voltage MCB. MCB 1101 includes battery cells 1111 to 1114, switches 1131 to 1142 and controller 1140 and output terminals 1151 and 1152. Controller 1140 includes a smart load communication bus 1161, a temperature input 1162 and voltage inputs 1064 to 1068. In this embodiment battery cells 1111 to 1114 exchange current pulses between each other. Switches 1131 to 1143 allow individual battery cells 1111 to 1114 to be connected in series or in parallel, or to form groups of battery cells. For example, when switches 1131, 1134, 1138, 1141 and 1143 are ON and all other switches are OFF, battery cells 1111 to 1114 are connected in series. In the situation that battery cells 1111 to 1114 are Lithium ion battery cells equally charged to a voltage of 4.2V, the battery can deliver a voltage of 16.8V between output terminals 1151 and 1152. By switching switches 1131, 1134 and 1136 ON and keeping all other switches OFF, the battery cells 1111 and 1112 are connected in series. This provides 8.4V voltage between the output connectors 1151 and 1152.

Table 1 shows output voltages and output currents corresponding to different switching configurations. Variable voltage MCB 1101 may communicate with a smart load (not shown) equipped with an MCB controller via smart load communication bus 1161. When the smart load controller requests a particular voltage or current, the MCB will dynamically self-reconfigure to satisfy the request. Such a variable voltage MCB has the advantage of eliminating a DC-DC voltage converter when a load requires a variable output voltage.

Figure 12:
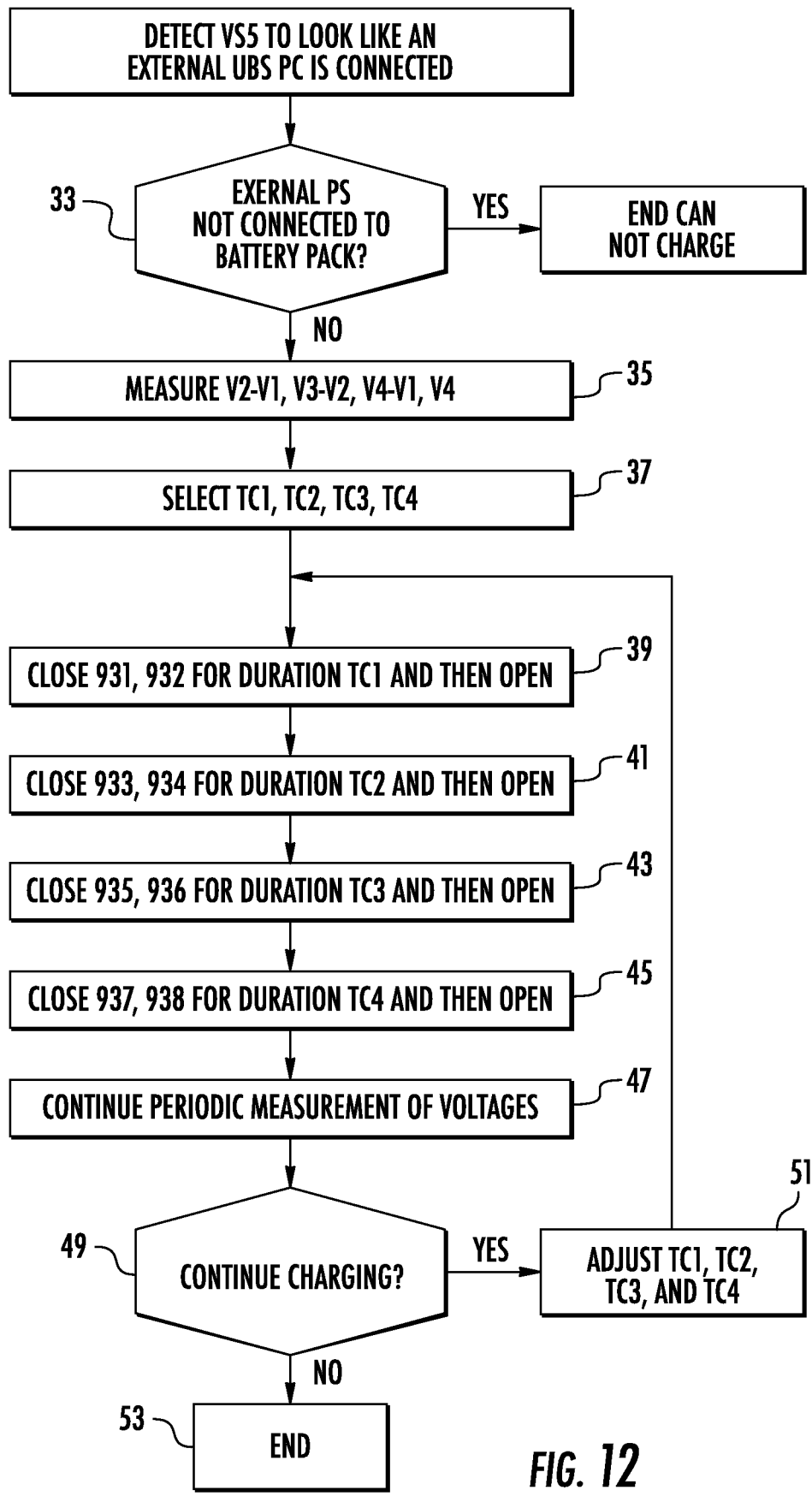
FIG. 12 is a flow diagram of an exemplary pulse charging sequence of the MCB of FIG. 9.

FIG. 12 is a flow diagram of an exemplary pulse charging sequence of the MCB of FIG. 9. Pulse charging of the four cell MCB 901 uses external power supply 915. At step 33 it is determined whether external power supply 915 is coupled to MCB 901. If it is not coupled, then pulse charging is not possible, shown by branch 'Yes' of decision block 33. If an external power supply is coupled, the process moves to step 35. At step 35 voltages V1 to V4 are measured and voltage differences V2-V1, V3-V2, V4-V1 are determined and compared with historical cell voltage measurements. At step 37, the charging time periods for cells 911, 912, 913 and 914 (TC1, TC2, TC3, TC4 respectively) are calculated. At step 39, switches 931 and 932 are closed for a period TC1 and then opened after TC1 finishes. All other switches remain open. Next, at step 41, switches 933 and 934 are closed for a period TC2. At the end of TC2, 933 and 934 are immediately open. All other switches remain open. At step 43, switches 935 and 936 are closed for a period TC3, and then open at the end of TC3. All other switches remain open. Thereafter, at step 45, switches 937 and 938 are closed for a period TC4 At the end of TC4 switches 937 and 938 are opened. All other switches remain open. Voltages V1 to V5 are measured continuously in the meantime, as shown at 47. At step 49, it is determined if the charging should continue. If it is determined that charging should not continue the process stops, at step 53. If it is determined that the charging should continue, the periods TC1, TC2, TC3 and TC4 are adjusted based on the current measurements in step 51 and the process returns to step 39

Figure 13:
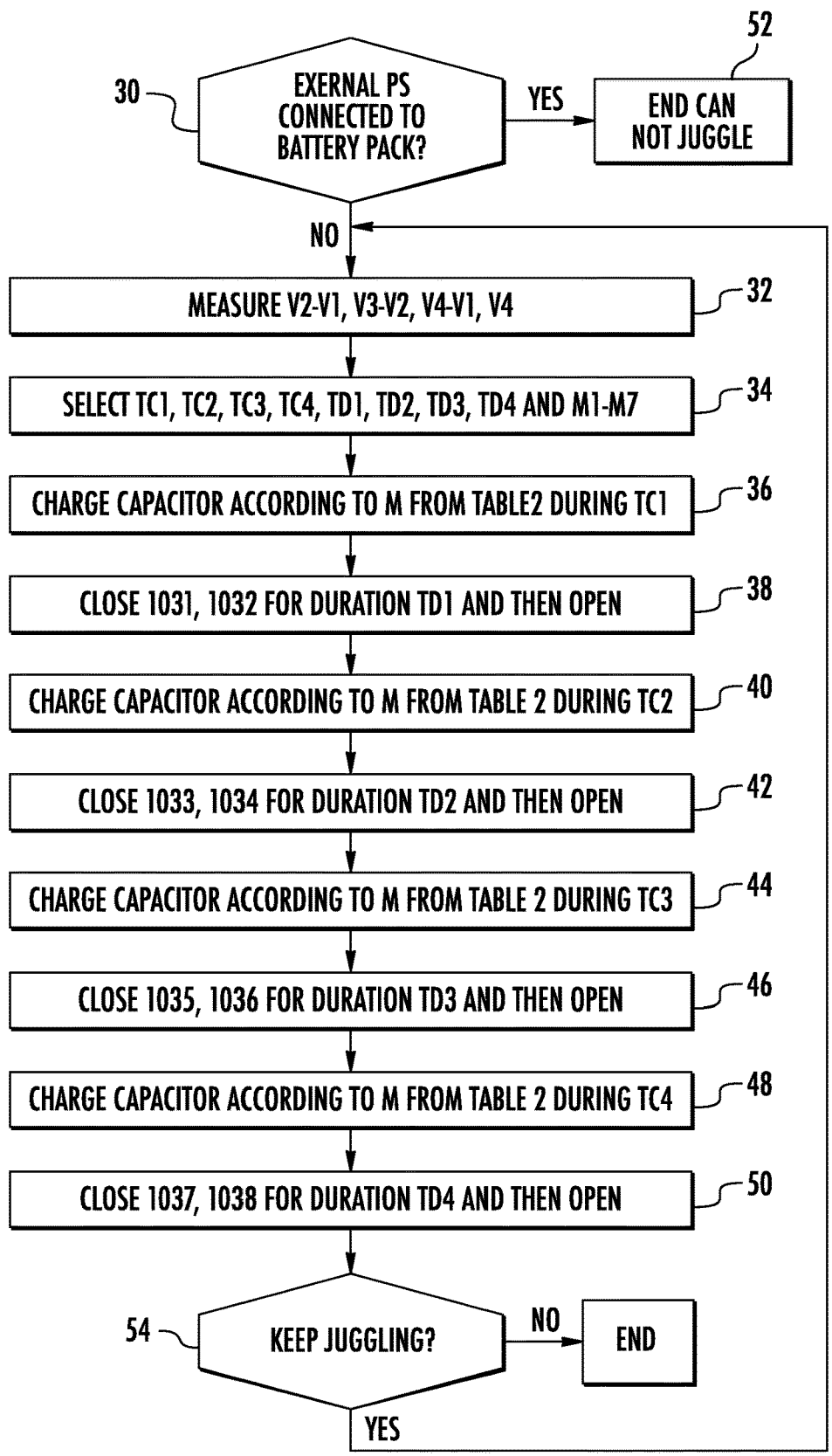
FIG. 13 is a flow diagram of an example pulse charging process of the four cell battery used in the circuit of FIG. 10.

FIG. 13 is a flow diagram of an example energy juggling process of the four cell battery used in the circuit of FIG. 10. At step 30 it is determined whether an external charger is coupled to MCB 1039. If a charger is coupled, no energy juggling takes place and the process ends at 52. If an external power supply not is coupled to MCB 1039, voltages V1 to V4 are measured and voltage differences V2-V1, V3-V2, V4-V1 are determined and compared with the historical values at step 32. Charge pulse durations for TC1, TC2, TC3, TC4 and discharge pulse durations TD1, TD2, TD3 and TD4 respectively for energy juggling are computed at step 34. A capacitor charging mode is also chosen from the possible capacitor charging modes M1 . . . M7 shown in Table 2 below. Capacitor 1021 is charged according to the selected capacitor charging mode M, at step 36, during TC1. The capacitor charging mode and duration determines the voltage that capacitor 1021 is charged to.

At step 38, switches 1031 and 1032 are closed for a period TD1, charging cell 1011 from capacitor 1021. Switches 1031 and 1032 are immediately opened at the end of TD1. At step 40, capacitor 1021 is charged according to the selected capacitor charging mode for period TC2. Next, at step 42, switches 1033 and 1034 are closed for a period TD2 charging cell 1012 and then immediately opened at the end of TD2.

Capacitor 1021 is now charged according to the selected mode at step 44, during TC3. At step 46, switches 1035 and 1036 are closed for a period TD3 charging cell 1033 and immediately opened at the end of TD3. Capacitor 1021 is again charged, this time according to the selected mode at step 48, during TC4. At step 50, switches 1037 and 1038 are closed for a period TD4 charging cell 1034 and then immediately opened at the end of TD4. Based on a voltage measurements, it is decided at step 54 if energy juggling should continue. If yes, the process returns to step 32. If no further energy juggling is needed, the process stops at step 52.

Table 2 shows the position of the switches for various modes M1-7, where '1' means that the respective switch is closed, '0' means that the switch is open.

TABLE 2

|    | 1031 | 1032 | 1033 | 1034 | 1035 | 1036 | 1037 | 1038 |
|----|------|------|------|------|------|------|------|------|
| M7 | 1    | 0    | 1    | 0    | 0    | 0    | 0    | 0    |
| M6 | 1    | 0    | 0    | 0    | 1    | 0    | 0    | 0    |
| M5 | 1    | 0    | 0    | 0    | 0    | 0    | 1    | 0    |
| M4 | 1    | 0    | 0    | 0    | 0    | 0    | 0    | 1    |
| M3 | 0    | 0    | 1    | 0    | 0    | 0    | 0    | 1    |
| M2 | 0    | 0    | 0    | 0    | 1    | 0    | 0    | 1    |
| M1 | 0    | 0    | 0    | 0    | 0    | 0    | 1    | 1    |

Figure 14:
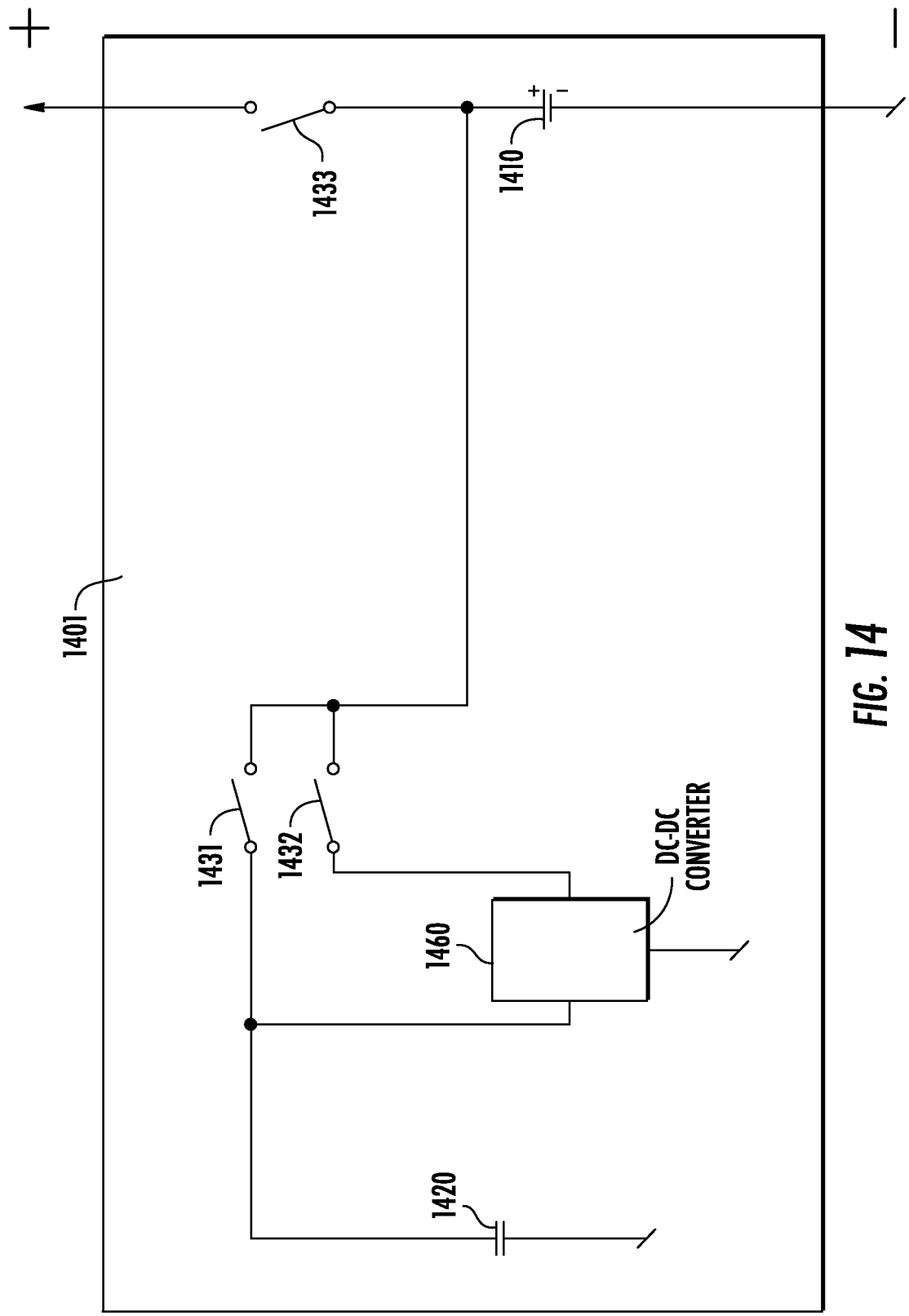
FIG. 14 is a schematic diagram of a battery using a DC to DC converter to generate a charging voltage.

FIG. 14 is a schematic diagram of a battery using a DC to DC converter to generate a charging voltage. Battery 1401 contains cell 1410, capacitor 1420, switches 1431, 1432 and 1433 and DC to DC converter 1460. Energy juggling proceeds as follows. With switch 1431 closed and all other switches open, capacitor 1420 is charged from cell 1410. Switch 1431 then opens and switch 1432 closes. DC to DC converter 1460 supplies a charging current to cell 1410 at a voltage higher than voltage of cell 1410. DC to DC converter 1460 converter allows independent control of the timing and amplitude of the charging pulse. DC to DC converter 1460 is controlled by MCB controller 3 in one embodiment. DC to DC converter 1460 may use a variety of known architectures. In one embodiment DC to DC converter 1460 is a boost type converter. In one embodiment a pulse duration of 0.5 sec and pulse amplitude of 2-3 Amperes is used. It should be understood that pulse duration, periodicity, amplitude and shape could be different for each type of battery cell or group of battery cells. The duration periodicity, amplitude and shape of periodic pulses can be determined based on operational parameters of the battery.

The number of battery cells is variable and is not limited to the examples described above. In large battery groups, individual battery cells may perform charging while other groups, or individual battery cells, are relaxing, and the remaining groups, or individual battery cells, are performing energy juggling.

In some cases energy juggling might be combined with battery charging. When combined, energy juggling may be performed for battery cells, or groups of battery cells, or batteries, not currently involved in the battery charging process. The energy juggling process may be performed while some battery cells of battery are in a relaxing period.

A similar approach may be used when the MCB delivers energy to an external load. In such a case, some individual battery cell, or group of cells, or batteries, may be connected to the load, while other battery cells, or groups, or batteries, are relaxing, and the remaining battery cells, or groups of cells, or batteries, are performing energy juggling. Relaxation time may be adjusted or even eliminated.

Energy juggling is applicable also to embodiments where the MCB contains battery cores of different shapes and sizes that are to be assembled in a desired overall shape having pre-designed dimensions. The physical differences of the cores leading to differences in their performance characteristics are compensated by controlled variable charging/discharging pulses, including pulse periods, the number of cores placed in the receiving groups and the delivery groups, during the energy juggling process.

Another embodiment of the MCB uses different batteries, or groups of batteries, placed at different locations within the electrical system. The energy juggling mechanism is now adjusted according to the specifics of each battery corresponding to its actual location. Same approach applies during the charging/discharging cycles.

Practical Applications

The methods described next are also applicable to batteries that must permanently be in a full state-of-charge for optimal operation.

It has been determined by experimentation that Li-ion batteries have an optimal charge level called 'vacation level'. When a Li-ion battery is stored at this charge level, minimum losses relative to its capacity are noted for long periods of time. For example, it is not recommended to store a Lithium-ion battery at a charge level below 15% from its nominal capacity for a long time. Conversely, if stored fully charged, the Li-ion battery quickly loses its charge storage capacity. Energy juggling can prevent unnecessary energy losses and significantly improves the lifetime of a Lithium-ion battery even when it is stored fully charged.

In some circumstances it may be important to keep a battery at full capacity for an extended period of time. For example, a battery used as a power back-up is required to deliver the full capacity at any moment of time. Therefore, for greatest portion of its working life this type of battery is fully charged. In this case, energy juggling may be performed using a short cycle pulse charging/discharging using a load and a charger. The load may be a 10 W, 1Ω resistor. The battery is discharged by several millivolts (mV) only in this embodiment of energy juggling. The voltage of the battery should be preferably monitored and the timing for pulse discharging/charging adjusted according to the measured voltage after each charging/discharging cycle, the voltage under load and the dynamics of voltage dropping under load. Charging may be performed through an USB power supply, via computer controlled solid state relay. The power supply voltage could be different from regular USB Vbus value, for example any value from 4.3V to 8 V. Other types of relays could be used, not limited to solid state relays. A reed relay would be beneficial because of high endurance and low voltage drop values. Regular signal or power relays may also be used.

Energy juggling may be done periodically or randomly. During the energy juggling process the energy may be transferred between all battery cells of a battery and in some cases the transfer may be performed from a battery cell with lower energy to a battery cell with higher stored energy level. The duration and periodicity of such energy loss prevention operations depends on the overall state-of-charge of the MCB, the state-of-charge of each battery core, battery temperature, battery age, optimal battery efficiency, desired battery self-discharge rate, etc.

Energy juggling also allows the MCB to be recharged to a range of different charge levels without affecting the battery's calendar lifetime and overall health status.

Energy juggling should e distinguished from cell leveling. Cell leveling is performed to maintain all cells in an MCB at an equal state of charge. Energy is always transferred from battery cells with higher amounts of stored energy to battery cells with lower amounts of stored energy. This transfer is usually done during battery charging and in some cases during battery discharging.

The energy juggling mechanism transfers energy between cells of an MCB periodically, during battery storage, or battery charging, or battery discharging. Unlike cell leveling, energy juggling intentional creates time varying differences between the state of charge of cells in an MCB. In the case of a single cell battery energy is moved back and forth between the cell and a temporary energy storage device.

In some embodiments energy juggling is combined with the cell leveling. However there are some situations where cell leveling is not desirable. For example, some battery cells in an MCB may be kept as reserve cells and purposely kept at long term vacation levels, different from the charge levels of working cells.

Capacity Restoration Based on Pulse Charge/Discharge

Battery capacity is equal to the total time a battery can deliver energy to a known load, (within prescribed current value limits) multiplied by the current. As such, the battery capacity is expressed in ampere hour (Ah) and is usually tested by connecting the battery to the load and measuring the time from start until the battery voltage reaches the low voltage threshold.

Testing the capacity restoration (recovery) of rechargeable battery is now described. A Sony Ericsson BST-33 battery with serial number 766135SWKFLT was used for the test. The previously number of cycles undergone for this battery was unknown. Estimated calendar age of the battery was around 5 years. During first capacity measurement test the battery has shown capacity of 150 mAh instead of the rated value of 900 mAh.

Experiment #1—Lifetime Recovery

One of the experiments used for recharging a battery comprises two phases. During a first phase, a constant current of 0.5 A was applied to the battery until it reached a 4.2V level. For Li-ion batteries 3.7V is considered the standard voltage, while 4.2V the maximum recommended voltage. During a second phase of charging a constant voltage of 4.2 V was maintained until the charging current decreased to 0.01 A. At this point the battery was disconnected from charger for a 10 minutes resting period, followed by a discharge at constant current of 0.5 A until the battery reached 3.0V level, which is the lowest voltage reached by the tested batteries. The battery was kept in idle state for a second resting period of 10 minutes. The above steps were repeated three times, and the maximum capacity of 900 mAh was recorded.

Experiment #2

In another experiment, a battery was connected to an external USB power supply via a solid state relay controlled by a computer. Computer based software performed a series of charging pulse cycles. The relay was kept in ON state for 3 sec and OFF state for 12 sec. The solid state relay with ON resistance of 250 mΩ was used. The battery voltage was measured after each 12 sec OFF period. The ON/OFF cycles where repeated until the battery voltage reached 4.2V at the end of 12 s OFF period. After this the battery was kept in idle state for 10 minutes of resting period. Its voltage was measured at the end of the resting period. If measured voltage was below 4.2V, another series of above described charge pulse cycles was performed until reaching the next resting period. Reaching of 5 resting periods was allowed. The battery pulse-discharging mode was initiated after a maximum of 5 resting periods.

Battery pulse-discharging was started after a 10 min resting period. Discharging current was kept at 1A level. Discharge ON time was 2 seconds, and discharge OFF time was 6 seconds. Pulse discharging was stopped after battery wattage reached 3V level. Battery was kept in idle state for 10 min before performing any other testing step. The total elapsed discharge ON time was considered to be the measured battery capacity value.

After performing of four such charge/discharge cycles, the battery delivered 850 mAh. A number of 100 pulse charge/discharge cycles have been performed with battery under test. The measured capacity was between 850 and 950 milli-Ah without showing any degradation.

Experiment #3

It has been determined experimentally that the capacity of an aged Li-ion battery, i.e. a battery with substantially reduced capacity and reduced performance characteristics may be restored if the battery which was containing a charge to a voltage Vinitial between 3V and 4.2V periodically performs following steps:
(a) the battery is pulse discharged to a voltage lower than the Vinitial by several millivolts (mV) and the total discharged energy is recorded, and thereafter,
(b) the battery is pulse charged with approximately same energy amount back.

The recorded energy amount discharged from and charged back to the battery is maintained at the same level and as such, the battery is maintained at approximately the same voltage level Vinitial after each pulse charging/discharging cycle.

Same treatment may be applied to new batteries. In this case, the battery capacity and performance do not deteriorate for a long period even when the battery is charged to the nominal voltage and exposed to a high temperature, i.e. +55° C. The period during which the battery was fully charged and exposed to high temperatures was 5 month, equivalent of 5 to 6 years of calendar life. The battery capacity was not fading during the entire period of testing.

Experiment #4

This testing was done with a battery charged from a USB power supply, 3 sec ON and 12 sec Off. The battery was discharged through a solid state relay to a 3 Ohm load, 2 sec ON and 6 sec OFF. The solid state relay has 250 mΩ, in ON state.

This test shows that when an aged battery with faded capacity is pulse charged and pulse discharged multiple times, its capacity is restored and the battery remains stable for a large number of subsequent pulse charge/discharge cycles. Such a large number of subsequent charge/discharge cycles is not expected, since the battery had exceeded both its calendar lifetime and its cycle life.

Experiment #5

The methods described herein may be used for controlled variable voltage MCB. Variable voltage MCB can use different reconfiguration/charging strategies depending on the available battery charger. An intelligent MCB will reconfigure itself according to an optimal mode, matching the available charger voltage/current.

For example, an electric power tool is equipped with a controller and a controlled voltage MCB. The tool controller communicates with the MCB controller to request the presently needed voltage and current as well as the voltage/current needed in the nearest future. The variable voltage MCB can supply power as requested. The result is a high efficiency for the power tool providing a longer working time compared to a regular power tool.

Another way in which the controlled variable voltage MCB may be used is for electric vehicles. Use of the methods of recharging provided here, allows the vehicle to achieve a higher efficiency and a longer driving range for the same amount of energy stored in the battery. Such controlled variable voltage MCB has an extended calendar life, without significant degradation of its capacity.

In battery systems with multiple cells, the multi cell structure could be reconfigured for pulsed energy exchange in different ways, e.g., in a ring, star or complicated switch fabric or other type of structure. Such a re-configurable multi-cell battery system may also be dynamically re-grouped according to the voltage and current requirements requested by a load, or as per the voltage/current capabilities of a charger. A battery system controller associated with the battery system may comprise a processor that determines a configuration schedule, based on communications from the external unit (whether the load or the charger). A configuration schedule comprises a sequence of one or more entries, each entry including a time and a battery system configuration. An exemplary configuration schedule may be [t1, configuration 1], [t2, configuration 2], [t3, configuration 3].

In an exemplary reconfigurable battery system, the battery system consists of 10 Li-ion cells, each of which provides a nominal voltage of 3.7V under the load of 1 A. The cell voltage ranges from 2.5V to 4.0V under this load. This battery system could be configured to provide power to a variable load, which may be exemplarily, a variable-speed electric motor coupled to the battery system via a variable voltage inverter. The variable voltage inverter provides the variable voltage necessary for variable speed control of the motor. As the inverter's efficiency is best when the input to output voltage ratio is at a minimum, it would be beneficial if the battery system provides a variable voltage to the input of the inverter. Such variable voltage output of the battery system is achieved by a dynamic regrouping of the system's battery cells, facilitated by signaling between a load controller (associated with the inverter/motor) and the battery system controller via a communication channel (which may be oneway or 2-way). For example, if the load controller requests that 3.7V, 1 A power is provided to the inverter, the battery system controller may connect, one at a time, each of the cells of the battery system to the load. This connection scheme provides the longest relaxation time for each cell and is the most efficient for the cell's discharge. Each battery cell participating in this mode may be connected to the load for time durations that are chosen based on cell's age, current state of charge and health. When the load controller requests an increase in output current with still the same output voltage, battery cells may still be connected to the load in rotation, but in some cases connected as parallel groups to facilitate the higher current. Decision of how many and which battery cells to be connected in parallel while delivering energy to the load is made by the battery system controller.

If the load controller requests an increase of the voltage delivered to the motor from 3.7V to 7.4V, the battery system controller may re-group battery cells in such a way that the load is connected to at least two battery cells connected in series at any instant in time. Battery cells deliver power to the load in such a series-formation for an assigned duration of time. Such a time assignment may be necessary to accommodate battery cell balancing and to prevent some cells from being discharged earlier than others. In some cases such battery formations are done as combination of serial and parallel connections. For example a group of two weaker battery cells connected in parallel is connected in series with another stronger cell. Other formations may also be contemplated. In some cases longer chains of multiple parallel connected cell groups are formed. Other combinations are also possible. If the maximum voltage of 37V is requested by the load controller, all 10 battery cells may be connected to the load in series. In case of one or several battery cells reaching their discharge limits, such cells would be eliminated from group formations in some modes. It is beneficial to give some weaker battery cells extended relaxation time periods while still using other cells of the system. After extended relaxation such weaker cells will be still discharged for some additional time. In some cases such weaker cells will be included into power delivery formations only in cases when the individual current for each participating cell and duration of time under such load current are below a calculated threshold.

While the above embodiments described how the battery system may be reconfigured as per communications received from the load controller, the load controller may also reconfigure its load conditions based on communication from the battery system controller. For example, the load controller will choose the motor speed variations based on battery system controller reports about remaining system capacity in each possible power delivery mode. In case of five battery cells having 30% remaining capacity and five other cells having 10% remaining capacity (despite of all efforts to balance the overall battery cell discharge), the load controller may limit motor speed modes to those allowing the appropriate/optimal usage of all energy stored in the battery system. The battery system controller reporting the overall battery cell health state allows the load controller to optimize the motor speed variations and select such speeds which are acceptable by the battery system controller to build battery formations for the load. The user might be given estimated load performance modes and time of use based on the battery system controller reports. In this case user might choose performance over longer drive time, or vice versa, for example.

Usage of such dynamically reconfigurable battery system with a variable load is not limited to the exemplary embodiment only. Another exemplary application of a reconfigurable battery system is in storage of solar and wind energy. Solar and wind energy systems provide variable amount of electricity at any given instant of time, on account of its dependency on the variable weather conditions. The battery system's health and thus, its calendar life can be enhanced if it is able to dynamically reconfigure according to real time requirements of the renewable energy source (and any external load that may eventually draw power from the battery system).

Communication between controllers of the energy source and the battery system would allow the battery system to re-configure in such a way that the battery system will provide the maximum possible storage capacity for the longest calendar life, as well as cycle life. When the energy source controller reports that it can provide a higher voltage, the current output battery system controller configures the battery system accordingly in order to match (e.g. in real-time) the battery cell formation voltage and the charging current capacity with the output level of the energy source. In the case of a simplified, controller-less energy source, the battery system controller may identify the necessary cell configuration based on obtained measurements on the energy source output. This/matching' of the battery system with the energy source output results in better efficiency.

We claim:

1. A method to operate a self-configurable multi-cell battery, wherein the multi-cell battery comprises a plurality of switches and a plurality of battery cores operatively coupled to each other, wherein each battery core comprises at least one battery cell, and wherein the method comprises:
controlling the plurality of switches to connect the plurality of battery cores in a series configuration or in a parallel configuration based at least on one or more of a current capability of a battery charger and a voltage capability of the battery charger.

2. The method of claim 1, further comprising:
controlling the plurality of switches to connect the plurality of battery cores in the series configuration or in the parallel configuration based at least on one or more of a voltage requirement of a load and a current requirement of the load.

3. The method of claim 1, further comprising:
determining a configuration schedule for the multi-cell battery based at least on the one or more of the current capability of the battery charger and the voltage capability of the battery charger,
wherein the configuration schedule specifies parallel and series connections between the plurality of battery cores for respective periods of time during charging the multi-cell battery, and
wherein controlling the plurality of switches includes controlling the plurality of switches to connect the plurality of battery cores in the series configuration or in the parallel configuration based on the determined configuration schedule.

4. The method of claim 3, further comprising:
determining the configuration schedule for the multi-cell battery further based on one or more of: age, state of charge, and health of the battery cells of the multi-cell battery.

5. The method of claim 1, wherein the plurality of battery cores are connected in series with each other in the series configuration, and wherein the plurality of battery cores are connected in parallel with each other in the parallel configuration.

6. The method of claim 1, wherein the at least one battery cell is a lithium-ion battery cell, a lithium-polymer battery cell, a nickel cadmium battery cell, a metal hydride battery cell, or a lead-acid battery cell.

7. The method of claim 1, further comprising:
determining one or more of the current capability of the battery charger and the voltage capability of the battery charger based on a communication with the battery charger.

8. A self-configurable multi-cell battery, comprising:
a plurality of battery cores, wherein each of the plurality of battery cores comprises at least one battery cell; and
a plurality of switches, operatively coupled to the plurality of battery cores, operable to connect the plurality of battery cores in a series configuration or in a parallel configuration based on one or more of a current capability of a battery charger and a voltage capability of the battery charger.

9. The multi-cell battery of claim 8, wherein the plurality of switches are further operable to connect the plurality of battery cores in the series configuration or in the parallel configuration based on one or more of a voltage requirement of a load and a current requirement of the load.

10. The multi-cell battery of claim 8, wherein the plurality of battery cores are connected in series with each other in the series configuration, and wherein the plurality of battery cores are connected in parallel with each other in the parallel configuration.

11. The multi-cell battery of claim 8, wherein the at least one battery cell is a lithium-ion battery cell, a lithium-polymer battery cell, a nickel cadmium battery cell, a metal hydride battery cell, or a lead-acid battery cell.

12. The multi-cell battery of claim 8, further comprising:
a controller, operatively coupled to the plurality of battery cores and the plurality of switches, configured to:
determine a configuration schedule for the multi-cell battery based at least on the one or more of the current capability of the battery charger and the voltage capability of the battery charger, wherein the configuration schedule specifies parallel and series connections between the plurality of battery cores for respective periods of time during charging of the multi-cell battery; and
control the plurality of switches to connect the plurality of battery cores in the series configuration or in the parallel configuration based on the determined configuration schedule.

13. The multi-cell battery of claim 12, wherein the controller is further configured to determine the configuration schedule for the multi-cell battery based on one or more of: age, state of charge, and health of the battery cells of the multi-cell battery.

14. A power tool, comprising:
a self-configurable multi-cell battery, wherein the self-configurable multi-cell battery comprises:
a plurality of battery cores, wherein each of the plurality battery cores comprises at least one battery cell; and
a plurality of switches, operatively coupled to the plurality of battery cores, operable to connect the plurality of battery cores in a series configuration or in a parallel configuration based on one or more of a current capability of a battery charger and a voltage capability of the battery charger.

15. The power tool of claim 14, wherein the plurality of switches are further operable to connect the plurality of battery cores in the series configuration or in the parallel configuration based on one or more of a voltage requirement of a load and a current requirement of the load.

16. The power tool of claim 14, wherein the plurality of battery cores are connected in series with each other in the series configuration, and wherein the plurality of battery cores are connected in parallel with each other in the parallel configuration.

17. The power tool of claim 14, wherein the at least one battery cell is a lithium-ion battery cell, a lithium-polymer battery cell, a nickel cadmium battery cell, a metal hydride battery cell, or a lead-acid battery cell.

18. The power tool of claim 14, further comprising:
a controller, operatively coupled to the plurality of battery cores and the plurality of switches, configured to:
determine a configuration schedule for the multi-cell battery based at least on the one or more of the current capability of the battery charger and the voltage capability of the battery charger, wherein the configuration schedule specifies parallel and series connections between the plurality of battery cores for respective periods of time during charging of the multi-cell battery; and
control the plurality of switches to connect the plurality of battery cores in the series configuration or in the parallel configuration based on the determined configuration schedule.

19. The power tool of claim 18, wherein the controller is further configured to determine the configuration schedule for the multi-cell battery based on one or more of: age, state of charge, and health of the battery cells of the multi-cell battery.

20. The power tool of claim 18, wherein the controller is further configured to communicate with the battery charger and a load powered by the multi-cell battery.

21. A self-configurable multi-cell battery, comprising:
a plurality of battery cores, wherein each of the plurality of battery cores comprises at least one battery cell; and
a plurality of switches, operatively coupled to the plurality of battery cores, operable to connect the plurality of battery cores in a series configuration or in a parallel configuration based on one or more of a current requirement of a load and a voltage requirement of the load.

22. The multi-cell battery of claim 21, wherein the plurality of switches are further operable to connect the plurality of battery cores in the series configuration or in the parallel configuration based on one or more of a voltage capability of a battery charger and a current capability of the battery charger.

23. The multi-cell battery of claim 21, wherein the plurality of battery cores are connected in series with each other in the series configuration, and wherein the plurality of battery cores are connected in parallel with each other in the parallel configuration.

24. The multi-cell battery of claim 21, further comprising:
a controller, operatively coupled to the plurality of battery cores and the plurality of switches, configured to:
determine a configuration schedule for the multi-cell battery based at least on the one or more of the current requirement of the load and the voltage requirement of the load, wherein the configuration schedule specifies parallel and series connections between the plurality of battery cores for respective periods of time during discharging of the multi-cell battery; and
control the plurality of switches to connect the plurality of battery cores in the series configuration or in the parallel configuration based on the determined configuration schedule.

25. The multi-cell battery of claim 24, wherein the controller is further configured to determine the configuration schedule for the multi-cell battery based on one or more of: age, state of charge, and health of the battery cells of the multi-cell battery.

* * * * *